United States Patent
Zhang et al.

(10) Patent No.: US 9,741,366 B1
(45) Date of Patent: *Aug. 22, 2017

(54) METHOD FOR FABRICATING A MAGNETIC WRITER HAVING A GRADIENT IN SATURATION MAGNETIZATION OF THE SHIELDS

(71) Applicant: Western Digital (Fremont), LLC, Fremont, CA (US)

(72) Inventors: Jinqiu Zhang, Fremont, CA (US); Feng Liu, San Ramon, CA (US); Ming Sun, San Jose, CA (US); Yunfei Li, Fremont, CA (US); Ming Jiang, San Jose, CA (US); Xiaojun Zhang, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/871,553

(22) Filed: Sep. 30, 2015

Related U.S. Application Data

(63) Continuation-in-part of application No. 14/575,090, filed on Dec. 18, 2014, now Pat. No. 9,214,165.

(51) Int. Cl.
  *G11B 5/127* (2006.01)
  *G11B 5/187* (2006.01)
  *G11B 5/31* (2006.01)

(52) U.S. Cl.
  CPC .......... *G11B 5/1272* (2013.01); *G11B 5/187* (2013.01); *G11B 5/315* (2013.01)

(58) Field of Classification Search
  CPC ........ G11B 5/1272; G11B 5/187; G11B 5/315
  See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |

(Continued)

OTHER PUBLICATIONS

Notice of Allowance dated Aug. 14, 2015 from U.S. Appl. No. 14/575,090, 8 pages.

(Continued)

*Primary Examiner* — Duy Deo
(74) *Attorney, Agent, or Firm* — Foley & Lardner LLP

(57) ABSTRACT

A method provides a magnetic transducer having a media-facing surface (MFS). The method includes providing a pole, providing a side gap, providing coil(s) for energizing the pole and providing side shield(s). A portion of the pole resides at the MFS. The side gap is between the pole and the side shield(s). The side shield(s) have a gradient in a saturation magnetization such that the saturation magnetization increases in a yoke direction perpendicular to the MFS. The step of providing the side shield(s) further includes providing a nonmagnetic structure having a side surface parallel to the MFS and providing at least one side shield layer. A portion of the side shield layer(s) are on the side surface. The portion of the side shield layer(s) has the gradient in the saturation magnetization. At least part of the side shield being formed by the portion of the side shield layer(s).

19 Claims, 18 Drawing Sheets

(56) References Cited

U.S. PATENT DOCUMENTS

| | | | |
|---|---|---|---|
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |

(56) References Cited

U.S. PATENT DOCUMENTS

| | | |
|---|---|---|
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |

(56) References Cited

U.S. PATENT DOCUMENTS

| | | | |
|---|---|---|---|
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,295,008 B1 * | 10/2012 | Sasaki | G11B 5/1278 360/125.02 |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,345,384 B1 * | 1/2013 | Sasaki | G11B 5/1278 360/125.15 |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |

(56) References Cited

U.S. PATENT DOCUMENTS

| | | |
|---|---|---|
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,470,186 B2 | 6/2013 | Chen et al. |
| 8,472,136 B2 | 6/2013 | Batra et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,079 B1 | 7/2013 | Song et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,830,626 B2 | 9/2014 | Heim et al. |
| 8,842,390 B2 | 9/2014 | Shen et al. |
| 9,214,165 B1 * | 12/2015 | Liu .................. G11B 5/11 |
| 2008/0273276 A1 | 11/2008 | Guan |
| 2010/0290157 A1 | 11/2010 | Zhang et al. |
| 2010/0321835 A1 | 12/2010 | Zhang et al. |
| 2011/0086240 A1 | 4/2011 | Xiang et al. |
| 2011/0097601 A1 | 4/2011 | Bai et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0063657 A1 | 3/2014 | Gao et al. |
| 2014/0154529 A1 | 6/2014 | Yang et al. |
| 2014/0175050 A1 | 6/2014 | Zhang et al. |

OTHER PUBLICATIONS

Office Action dated Apr. 30, 2015 from U.S. Appl. No. 14/575,090, 7 pages.

* cited by examiner

Plan View

Apex View

Plan View

Apex View

Plan View

Apex View

Plan View

Apex View

Plan View

Apex View

Plan View

Apex View

Plan View

Apex View

Plan View

Apex View

Plan View

Apex View

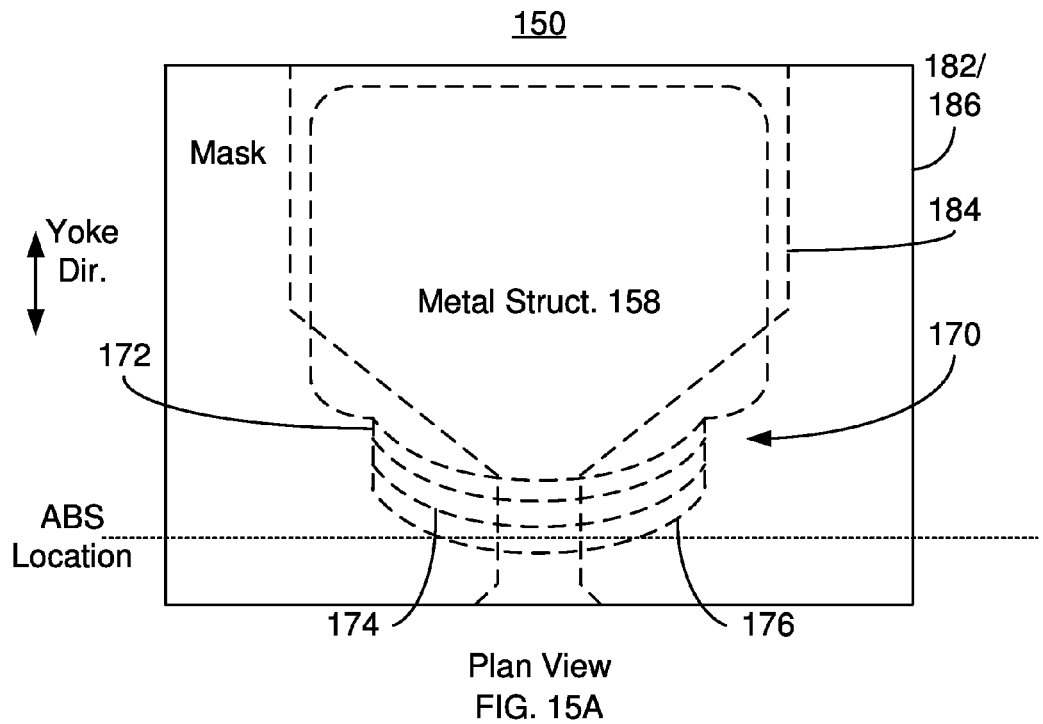
Plan View
FIG. 15A
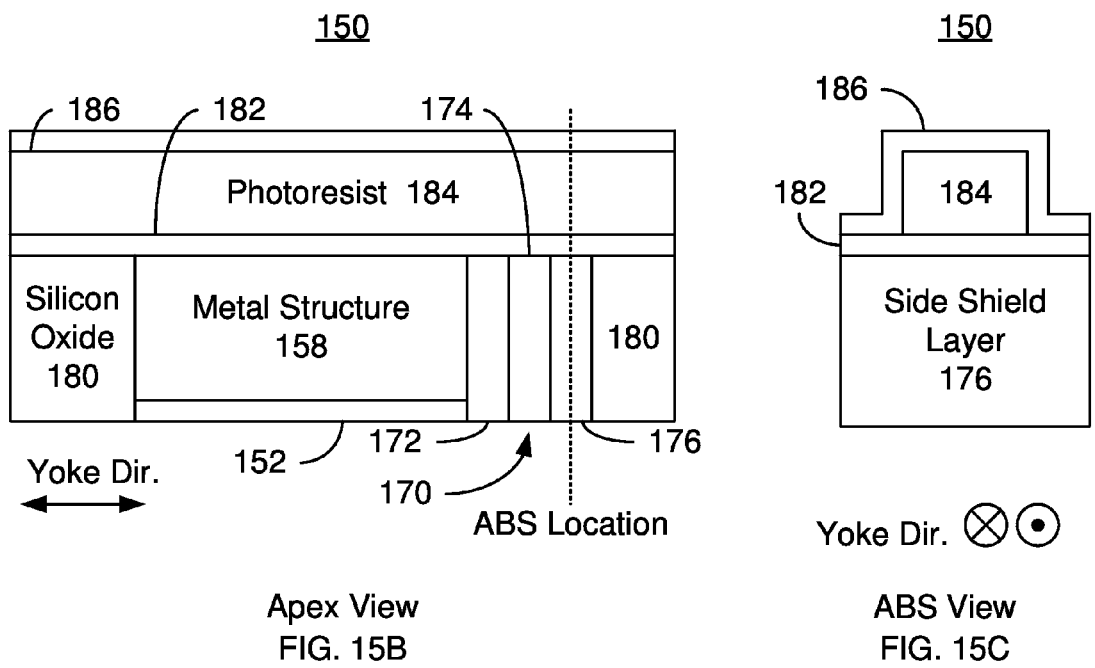
Apex View
FIG. 15B
ABS View
FIG. 15C

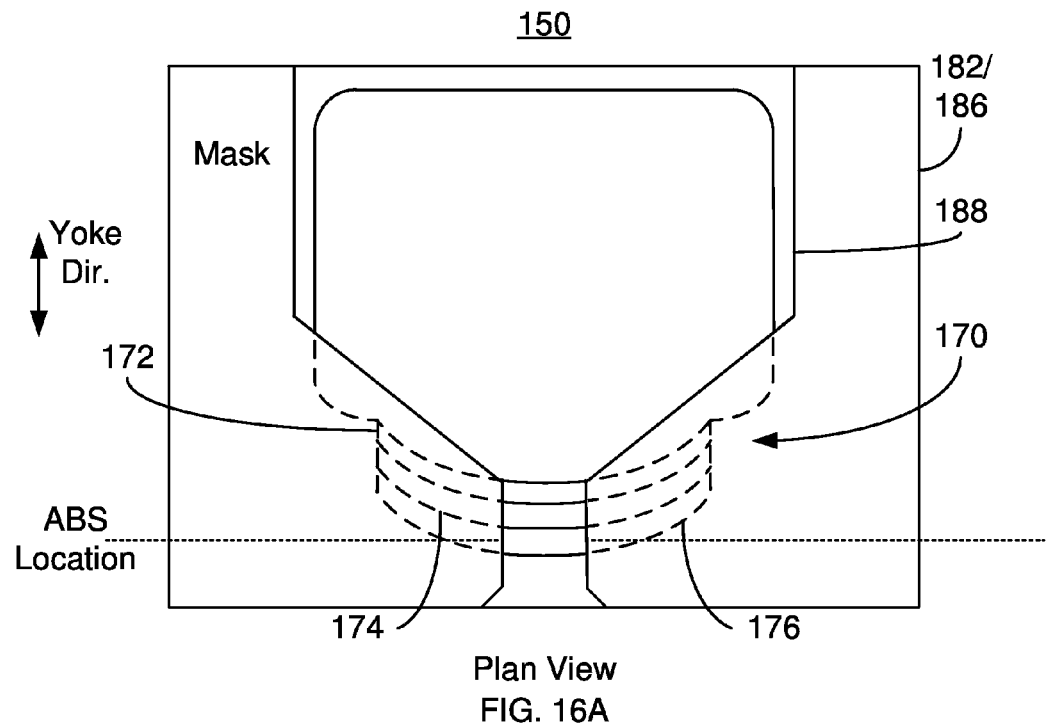
Plan View
FIG. 16A
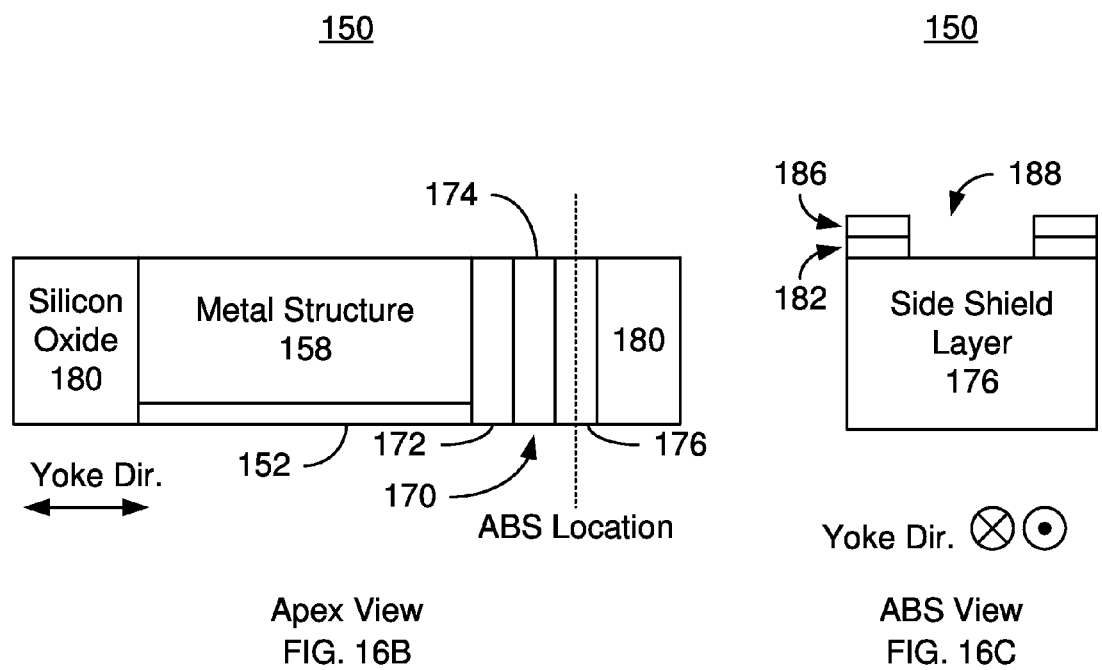
Apex View
FIG. 16B
ABS View
FIG. 16C

Plan View

Apex View

ABS View

Recessed View

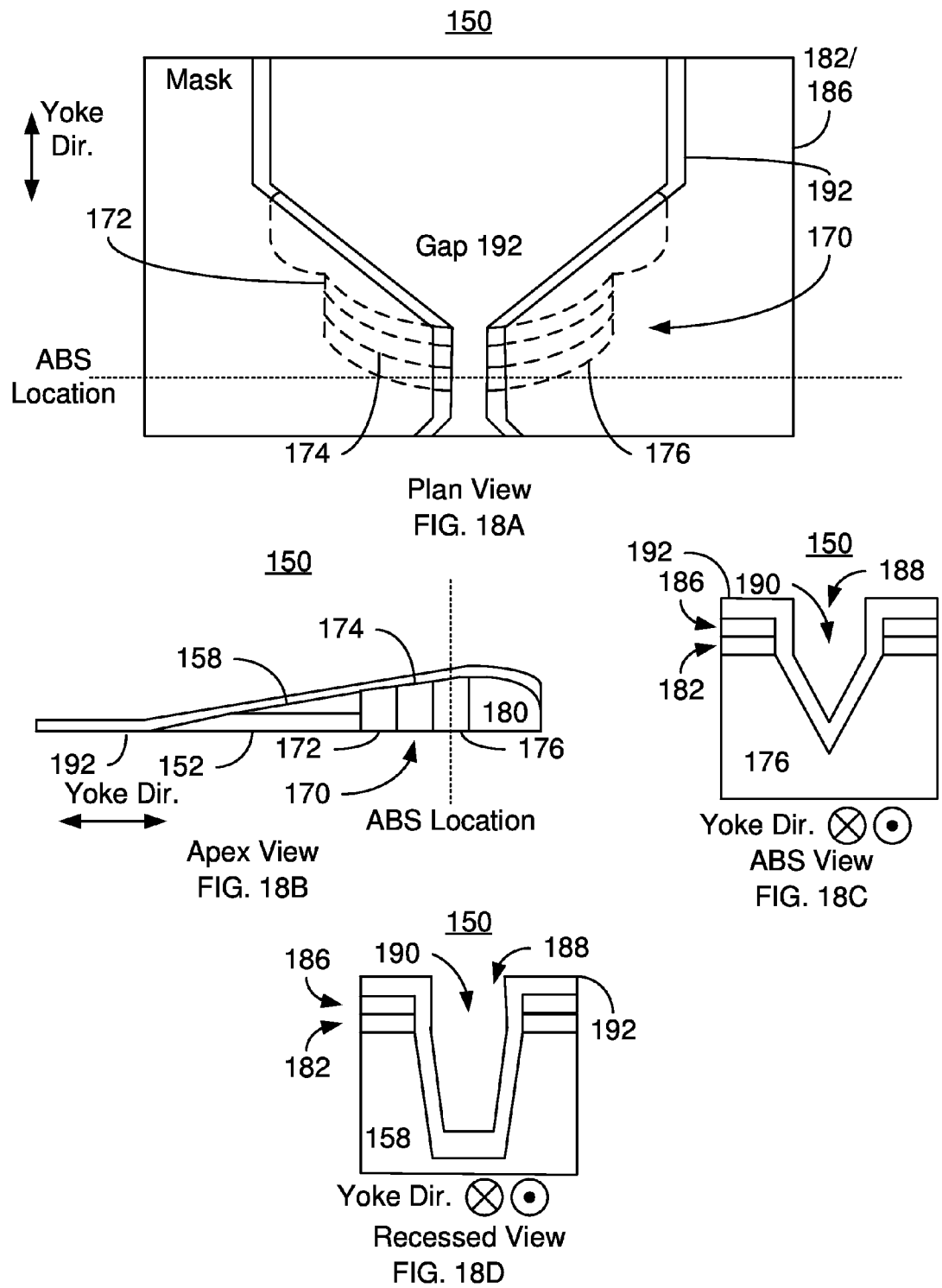

Plan View

Apex View

ABS View

Recessed View

METHOD FOR FABRICATING A MAGNETIC WRITER HAVING A GRADIENT IN SATURATION MAGNETIZATION OF THE SHIELDS

CROSS-REFERENCE TO RELATED APPLICATIONS

The present application is a continuation-in-part of co-pending patent application Ser. No. 14/575,090, filed Dec. 18, 2014, entitled "Magnetic Writer Having a Gradient in Saturation Magnetization of the Shields", and assigned to the assignee of the present application.

BACKGROUND

FIGS. 1A and 1B air-bearing surface (ABS) and plan views, respectively, of a conventional magnetic recording transducer 10. The magnetic recording transducer 10 may be a perpendicular magnetic recording (PMR) head. The conventional transducer 10 includes an underlayer 12 that may include a leading shield, side gap 14, side shields 16, top gap 17, a top (or trailing) shield 18 and main pole 20.

The main pole 20 resides on an underlayer 12 and includes sidewalls 22 and 24. The sidewalls 22 and 24 of the conventional main pole 20 form an angle with the down track direction at the ABS. The side shields 16 are separated from the main pole 20 by a side gap 14. The side shields 16 extend at least from the top of the main pole 20 to the bottom of the main pole 20. The side shields 16 also extend a distance back from the ABS. The gap 14 between the side shields 16 and the main pole 20 may have a substantially constant thickness. Thus, the side shields 16 are conformal with the main pole 20.

Although the conventional magnetic recording transducer 10 functions, there are drawbacks. In particular, the conventional magnetic recording head 10 may not perform sufficiently at higher recording densities or for some recording schemes. Accordingly, what is needed is a system and method for improving the performance of a magnetic recording transducer.

DETAILED DESCRIPTION OF THE PREFERRED EMBODIMENTS

Figure 1A:
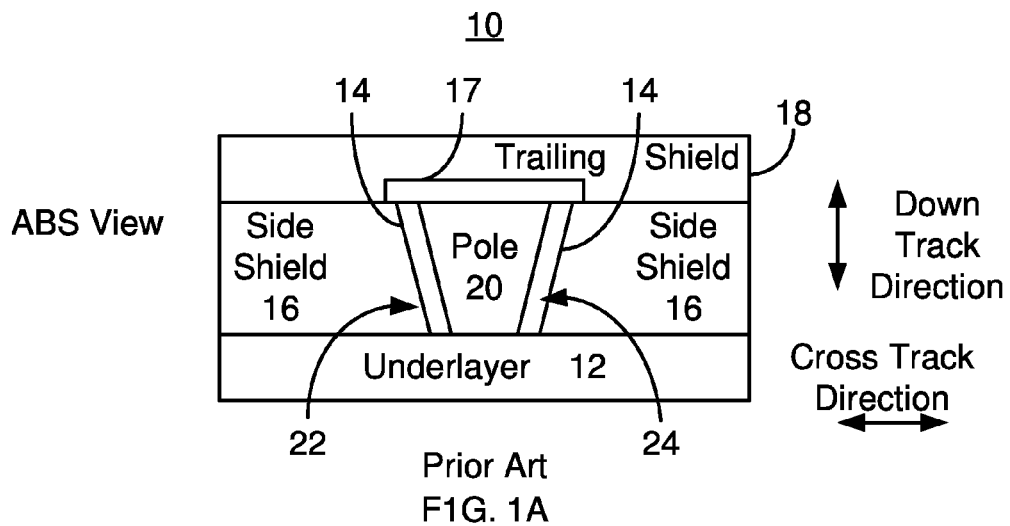
FIGS. 1A-1B depict ABS and plan views of a conventional magnetic recording head.
Figure 1B:
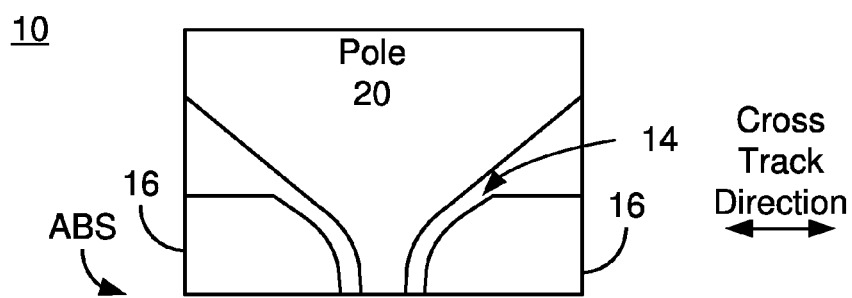

The trend in magnetic recording is to higher densities. For such higher recording densities, a full wrap around shield may be used. For example, the trailing shield 18, side shields 16 and a leading shield in the underlayer 12 may be used in the transducer 10 depicted in FIGS. 1A-1B. The trailing shield 18 may have a high saturation magnetization of approximately 2.3 T. The high saturation magnetization may be desired to provide the desired field gradient. The leading shield of the underlayer 12 may have a low saturation magnetization on the order of 1 T. The low saturation magnetization of the leading shield may aid in balancing on and off track performance. The side shield 16 has a higher saturation magnetization of approximately 2 T.

In some cases, different writing schemes are used to facilitate higher density recording. For example, a shingle recording scheme may be desired to be used at higher areal densities. In shingle recording, successive tracks partially overwrite previously written tracks in one direction only. Part of the overwritten tracks, such as their edges, are preserved as the recorded data. In shingle recording, a higher side shield saturation magnetization may be desired.

It has been determined that there may be issues in high density recording for the configurations and writing schemes described above. For the full wraparound shield described above, a mismatch between the saturation magnetizations of the side shield 16 and the trailing shield 18 may result in flux leakage at the interface between the side shield 16 and the trailing shield 18. This flux leakage may result in wide area track erasure (WATER) issues. For shingle recording, the higher saturation magnetization side shield may shunt flux from the main pole 20. Writing may thus be degraded. In addition, switching of the main pole 20 is a dynamic process. This switching may perturb the domain structure of the side shields 16 and result in magnetic poles in the side shields 16 at the ABS and motions of domain walls with in the side shield 16. These also result in WATER issues. Consequently, it has been determined that there are unaddressed issues in recording at higher areal densities.

While the various embodiments disclosed are applicable to a variety of data storage devices such as magnetic recording disk drives, solid-state hybrid disk drives, networked storage systems etc., for the sake of illustration the description below uses disk drives as examples.

Figure 2A:
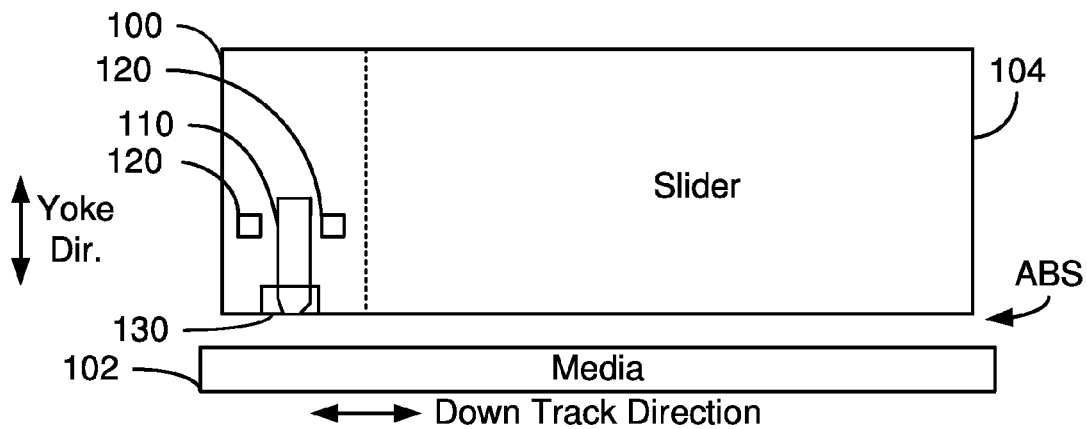
FIGS. 2A, 2B and 2C depict side, ABS and plan views of portions of an exemplary embodiment of a magnetic recording disk drive with side shields having a gradient in saturation magnetization.
Figure 2B:
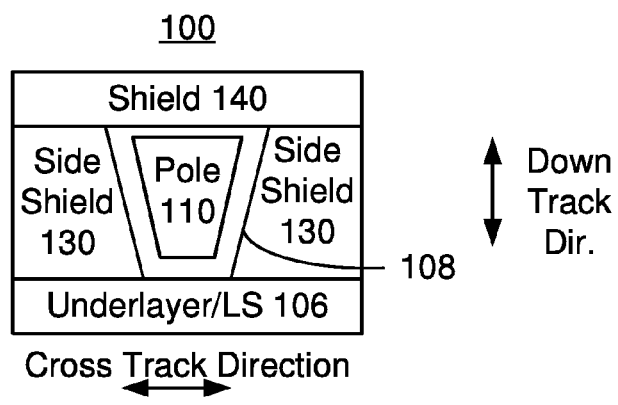
Figure 2C:
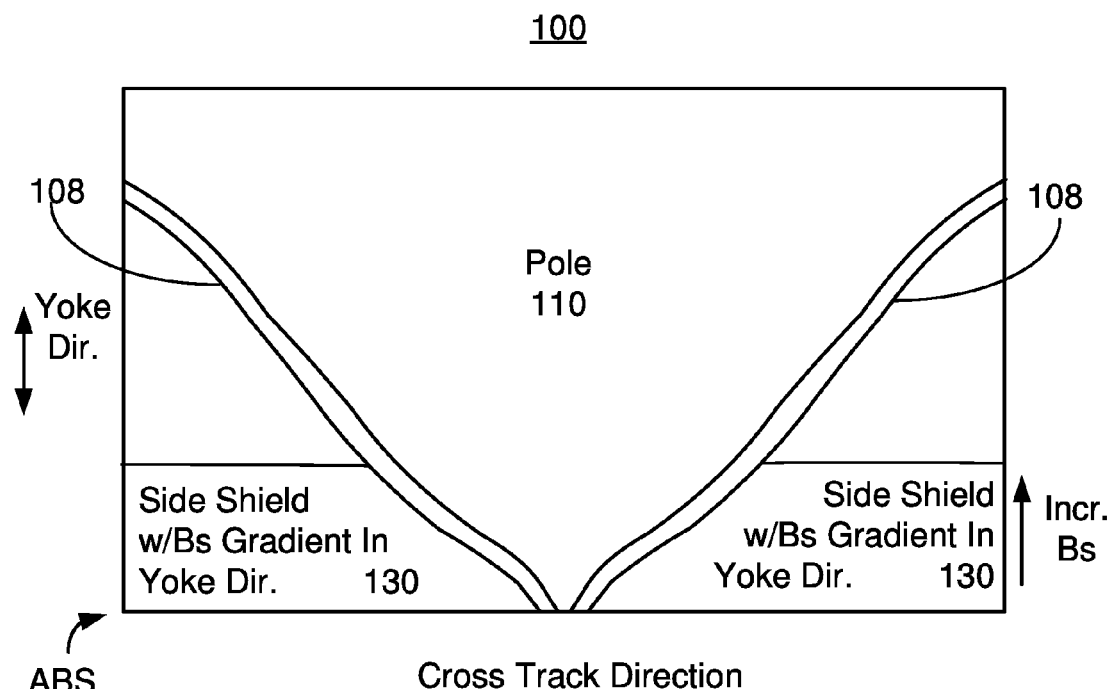

FIGS. 2A, 2B and 2C depict various views of an exemplary embodiment of a magnetic write apparatus. In the embodiment shown, the data storage device is disk drive. FIG. 2A depicts a side view of the disk drive including a magnetic write apparatus 100 that is a magnetic write transducer in the embodiment shown. FIG. 2B depicts a media-facing surface view. In the embodiment shown, the magnetic write apparatus is a transducer 100. Thus, the media-facing surface is the air-bearing surface (ABS). FIG. 2C depicts a plan view of the transducer 100. For clarity, FIGS. 2A-2C are not to scale. For simplicity not all portions of the disk drive and transducer 100 are shown. In addition, although the disk drive and transducer 100 are depicted in the context of particular components other and/or different components may be used. For example, circuitry used to drive and control various portions of the disk drive is not shown. For simplicity, only single components are shown. However, multiples of each components and/or their sub-components, might be used. The disk drive may be a perpendicular magnetic recording (PMR) disk drive. However, in other embodiments, the disk drive may be configured for other types of magnetic recording included but not limited to heat assisted magnetic recording (HAMR).

The disk drive includes a media 102 and a slider 104 on which the transducer 100 has been fabricated. Although not shown, the slider 104 and thus the transducer 100 are generally attached to a suspension. In general, the slider 104 includes the write transducer 100 and a read transducer (not shown). However, for clarity, only the write transducer 100 is shown.

The transducer 100 includes an underlayer 106, a gap 108, a main pole 110, coil(s) 120, side shields 130 and optional trailing shield 140. The underlayer 106 may include a bottom (or leading) shield. The coil(s) 120 are used to energize the main pole 110. Two turns are depicted in FIG. 2A. Another number of turns may, however, be used. Note that only a portion of the coil(s) 120 may be shown in FIG. 2A. If, for example, the coil(s) 120 is a spiral, or pancake, coil, then additional portions of the coil(s) 120 may be located further from the ABS. Further, additional coils may also be used.

The main pole 110 is shown as having a top wider than the bottom. The main pole 110 thus includes sidewalls having sidewall angles that are greater than or equal to zero. In an embodiment, these sidewall angles differ at different distances from the ABS. In other embodiments, other geometries may be used. For example, the top may be the same size as or smaller than the bottom. The sidewall angles may vary in another manner. The main pole 110 is depicted as having a trapezoidal shape including a flat bottom at the ABS. In other embodiment, the main pole 110 may have another shape including but not limited to a triangle at the ABS. In some embodiments, the main pole 110 may have leading surface bevel and/or a trailing surface bevel. Thus, the main pole 110 may be shorter in the down track direction at the ABS than at location(s) recessed from the ABS.

The gap layer 108 may include one or more sublayers as well as a seed layer. Further, although depicted as a single gap surrounding the main pole 110, the gap 108 may include separate side gaps (between the mail pole 110 and side shields 130) and write gap (between the main pole 110 and trailing shield 140). In addition, although depicted as symmetric, the gap 108 may be asymmetric. For example, the gap between a side of the main pole 110 and one side shield may be wider than the gap between the opposite side of the main pole 110 and the other side shield.

The transducer 100 also includes side shields 130. The side shields 130 may be magnetically and, in some embodiments, physically connected with the trailing shield 140 and leading shield of the underlayer 106. In such embodiments, a full wraparound shield is formed. In other embodiments, the side shields 130 may be physically and/or magnetically disconnected from the trailing shield 140 and/or the leading shield of the underlayer 106. The side shields 130 are also depicted as symmetric in the cross track direction. In other embodiments, asymmetries in the cross track direction may be present.

As can be seen in FIG. 2C, the side shields 130 have a gradient in saturation magnetization ($B_s$) such that the saturation magnetization increases in a yoke direction perpendicular to the ABS. In some embodiments, the saturation magnetization increase monotonically with distance from the ABS. In other words, the $B_s$ increases, without any decreases, with distance from the ABS. This increase may be linear, step-wise, or described in another manner. In other embodiments, the increase in saturation magnetization need not be monotonic and/or need not be described by a well-known function. Thus, in some embodiments, the saturation magnetization of portions of the side shields 130 recessed from the ABS is greater than the saturation magnetization of portions of the side shields 130 at the ABS. In some embodiments, the saturation magnetization of portions of the leading shield 106 recessed from the ABS is greater than the saturation magnetization of portions of the leading shield 106 at the ABS. Similarly, in some embodiments, the saturation magnetization of portions of the trailing shield 140 recessed from the ABS is greater than the saturation magnetization of portions of the trailing shield 140 at the ABS. Thus, at least the side shields 130 have a saturation magnetization that increases with increasing distance from the ABS. In some embodiments, the leading shield 106 and/or trailing shield 140 may also have a saturation magnetization that changes with distance from the ABS. In alternate embodiments, the gradient might be different than described above. For example, the saturation magnetization might decrease with distance from the ABS.

The gradient in saturation magnetization may be achieved in a number of ways. In some embodiments, the concentration of various constituents in the alloy(s) of the side shields 130, leading shield 106 and/or trailing shield 140 may be varied such that $B_s$ increases with increases distance from the ABS in the yoke direction. In other embodiments, regions of different saturation magnetizations may be provided. For example, a layer closest to and including the ABS may be an alloy having one saturation magnetization. The next layer in the yoke direction may be another alloy having another higher $B_s$, and so on. For example, in some embodiments, the saturation magnetization of the side shields 130 at the ABS may be at least 1 T and not more than 2 T. In some such embodiments, the $B_s$ is not more than 1.6 T. In other embodiments, $B_s$ at the ABS is at least 1 T and not more than 1.2 T. Further from the ABS, the saturation magnetization is greater. For example, $B_s$ may be greater than 2 T some distance from the ABS. In some embodiments, $B_s$ is at least 2.3 T at the back surface of the side shields 130 furthest from the ABS. The leading shield 106 and trailing shield 140 may be similarly configured. In other embodiments, the variations in the saturation magnetization of the leading shield 106 and/or trailing shield 140 may differ from that of the side shields 130. In some embodiments, the saturation magnetizations of the shields 106, 130 and 140 may match throughout the shields. In other cases, the saturation magnetizations of the shields 106, 130 and 140 may be different in all locations. In still other embodiments, the saturation magnetizations of the shields 106, 130 and 140 may be the same in some locations, but different in other locations. For example, the trailing shield 140 may have a saturation magnetization of at least 2 T at the ABS and at least 2.3 T some distance from the ABS. The side shields 130 might have a saturation magnetization of 1-1.2 T at the ABS and 2.3 T further from the ABS. The interfaces between the regions of different saturation magnetization may be at some angle less than ninety degrees from the ABS. In some such embodiments, the layers having different saturation magnetizations have interfaces that are parallel to the ABS. In some embodiments, the saturation magnetization is constant in planes parallel to the ABS. For example, the $B_s$ does not vary in the down track and/or cross track directions for a plane parallel to the ABS. In other embodiments, $B_s$ may vary along the down track and/or cross track directions. For example, the saturation magnetization may decrease with increasing distance from the pole 110 in the cross track direction. In some embodiments, the saturation magnetization of the side shields 130 may the same as that of the main pole 110 (e.g. 2.4 T) near the main pole 110. The saturation magnetization of the side shields 130 follows a gradient in the cross-track direction, decreasing to 1.0 T near the edges furthest from the main pole 110.

Performance of the transducer 100 and disk drive may be improved by the side shields 130 having a gradient in the saturation magnetization. Because portion(s) of the side shields 130 closest to the ABS has a lower magnetic moment, flux shunting may be reduced. However, portion(s) the side shields 130 further from the ABS have a higher saturation magnetization. Similar benefits might be achieved by configuring the leading shield 106 and/or the trailing shield 140 with a gradient in saturation magnetization such that the saturation magnetization increases in the yoke direction. Consequently, the gradient in the field from the pole may be improved. This increase may be particularly relevant for shingle recording. The increased saturation magnetization of portion(s) of the side shields 130 recessed from the main pole 110 may be less affected by the dynamic nature of switching of the main pole 110. The reduced saturation magnetization of the side shields 130 allows the side shields 130 to be less affected the return field from the media 102. These features may help address WATER and other issues. Thus, performance of the transducer 100 may be improved.

Figure 3:
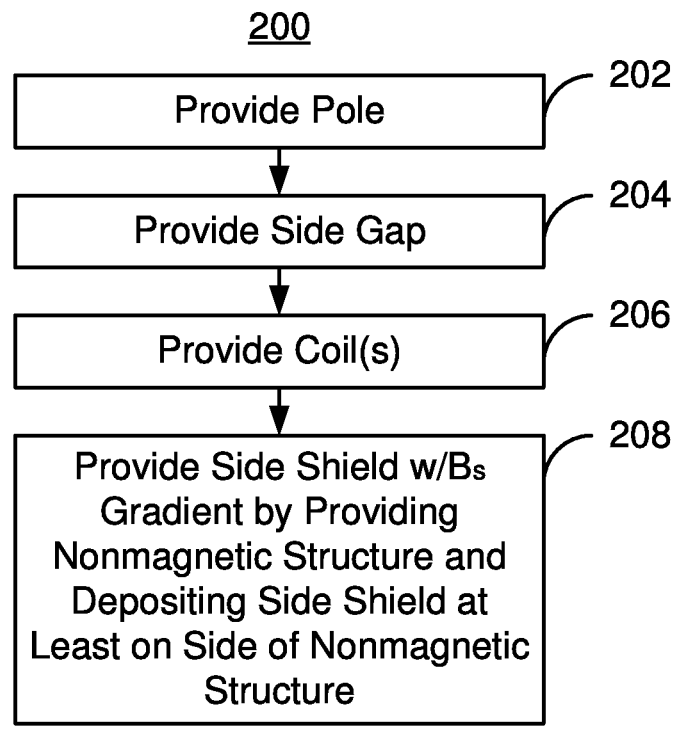
FIG. 3 is a flow chart depicting an exemplary embodiment of a method for providing a magnetic recording write apparatus having a gradient in side shield saturation magnetization.

FIG. 3 depicts an exemplary embodiment of a method 200 for providing a magnetic recording transducer or analogous data storage device. For simplicity, some steps may be omitted, interleaved, performed in another order and/or combined. The method 200 may be used to fabricate multiple magnetic recording transducers at substantially the same time. The method 200 is described in the context of the magnetic transducer 100. The method 200 may also be used to fabricate other magnetic write apparatus. The method 200 is also described in the context of particular layers. A particular layer may include multiple materials and/or multiple sub-layers. The method 200 also may start after formation of other portions of the magnetic recording transducer. For example, the method 200 may start after the underlayer, optionally including a leading shield, has been formed.

The main pole 110 is formed, via step 202. In some embodiments, step 202 includes forming a trench in one or more nonmagnetic layers. For example, one or more reactive ion etches (RIEs) may form the trench. The trench has a shape and location that corresponds to the pole. In other embodiments the trench may be provided in the side shields. Magnetic material(s) for the pole are deposited. The transducer may then be planarized. A leading and/or trailing edge bevel(s) may optionally be formed on the leading surface (bottom) and/or trailing surface (top) of the main pole.

The side gap 108 is provided, via step 204. Step 204 may include depositing a Ru layer, for example via chemical vapor deposition, sputtering or another method. Additional layer(s) may also be provided. In some embodiments, step 204 is performed before step 202. For example, if the side shields 130 are formed first, step 204 may include removing a portion of the material(s) for the side shield 130 to form a trench therein. The materials for the side gap 108 would then be deposited. The side gap would be formed by the portion of the side gap materials that reside in the trench. The pole 110 formed in step 202 may also reside in the trench. Thus, the main pole 110 is provided on the side gap 108 in such embodiments. In other embodiments, the main pole 110 might be fabricated first and the side gap 108 formed on the main pole 110.

The coil(s) 120 for the main pole are provided, via step 206. Step 206 may be interleaved with other steps of the method 200. For example, portions of the coil(s) 120 may be formed before the main pole 110 and side shields 130. The coil(s) formed may be helical coil(s) or spiral coils.

The side shields 130 having the gradient in saturation magnetization is provided, via step 208. The step of providing the side shield further includes providing a nonmagnetic structure having a side surface parallel to the ABS. Stated differently, at least a portion of the side surface is parallel to the ABS and the side surface is generally oriented in the same direction in the ABS. However, the side surface need not be completely flat or perfectly parallel to the ABS. In some embodiments, the nonmagnetic structure is a metal structure that is removable, for example via an ion mill or reactive ion etch (RIE). The nonmagnetic structure may thus be a sacrificial structure. In some embodiments, the nonmagnetic structure may be formed of NiP, Cu, Ru, and/or NiCr.

One or more shield layers are also deposited as part of step 208. The shield layer(s) may be conformally deposited, for example via plating or sputtering. A seed layer may also be deposited prior to the shield layer(s). At least part of the shield layer(s) reside on the side surface of the nonmagnetic structure. As a result, portions of the shield layer(s) have interfaces that are substantially parallel to the ABS. One or more of the shield layer(s) may also have a composition that is varied during deposition. If multiple shield layers are used, the shield layers have different compositions and different saturation magnetizations. Thus, the shield layer(s) may have a gradient in saturation magnetization in a direction substantially perpendicular to the side surface of the nonmagnetic structure. As a result, a side shield having a gradient in saturation magnetization in the yoke direction is fabricated. In embodiments in which the side gap 108 and main pole 110 are formed on the side shield layer(s), a portion of the side shield on which the main pole 110 resides may form the leading shield 106.

Using the method 200, a magnetic transducer having improved performance may be fabricated. Because of the gradient in the saturation magnetization of the side shields 130 the benefits thereof may be achieved.

Figure 4:
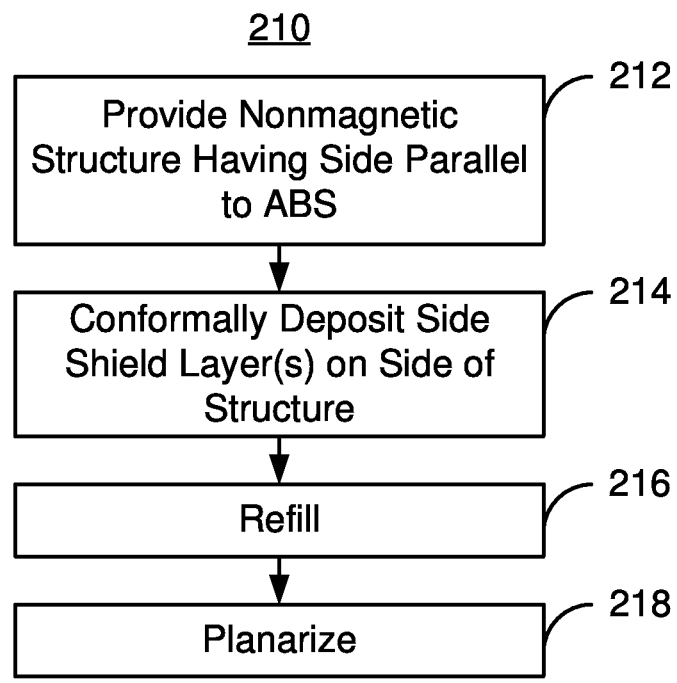
FIG. 4 is a flow chart depicting an exemplary embodiment of a method for providing a side shield having a gradient in side shield saturation magnetization.

FIG. 4 depicts an exemplary embodiment of a method 210 for providing a side shield having a gradient in saturation magnetization. For simplicity, some steps may be omitted, interleaved, performed in another order and/or combined. The method 210 may be used to fabricate multiple magnetic recording transducers at substantially the same time. The method 210 is described in the context of the side shields 130 of the magnetic transducer 100. The method 210 may also be used to fabricate other side shields of other magnetic write apparatus. The method 210 is also described in the context of particular layers. A particular layer may include multiple materials and/or multiple sub-layers. The method 210 also may start after formation of other portions of the magnetic recording transducer. For example, the method 210 may start after the underlayer has been formed.

A nonmagnetic structure having a side surface parallel to the ABS is provided, via step 212. As discussed above, the side surface being parallel to the ABS indicates that the side surface is generally oriented in the same direction in the ABS. However, as discussed above, the side surface need not be completely flat or perfectly parallel to the ABS. In some embodiments, the nonmagnetic structure may be formed of NiP, Cu, Ru, and/or NiCr. Step 212 may include providing a mask having an aperture in the desired shape and location as the nonmagnetic structure. The nonmagnetic metal may then be deposited and the mask removed. For example, a photoresist mask may be used and the nonmagnetic metal may be plated. In some embodiments, the nonmagnetic structure is oriented such that the side shield is desired to be built on the side surface with the lowest saturation magnetization closest to the nonmagnetic structure. In some such embodiments, the nonmagnetic structure may be on a portion of the wafer on which the transducer 100 is fabricated that does not become part of the final device 100. In other embodiments, the highest saturation magnetization may be deposited first. In some such embodiments, the nonmagnetic structure may be located in the yoke direction from the ABS. In such embodiments, some part of the nonmagnetic structure may remain in the final device 100. However, other configurations are possible.

One or more shield layers are deposited, via step 214. The shield layer(s) may be conformally deposited in step 214, for example via plating or sputtering. Step 214 may also include depositing a seed layer prior to the shield layer(s). At least part of the shield layer(s) reside on the side surface of the nonmagnetic structure. As a result, portions of the shield layer(s) have interfaces that are substantially parallel to the ABS. In addition, the growth direction of the side shield layer(s) is generally outward (in the yoke direction) from the side surface of the nonmagnetic structure. Thus, shield layers having different saturation magnetizations may be deposited. One or more of the shield layer(s) may also have a composition that is varied during deposition. For example, such a shield layer may be plated in a single plating cell having a plating bath that varies in concentration. Thus, the composition may vary with distance from the side surface of the nonmagnetic structure. As a result, each of the shield layer(s) may have a gradient in saturation magnetization in a direction substantially perpendicular to the side surface of the nonmagnetic structure. If formed of this single shield layer that varies in composition, the side shield may be fabricated in a single plating bath. In addition, if multiple shield layers are used, the shield layers have different compositions and different saturation magnetizations. Thus, the shield layer(s) may have a gradient in saturation magnetization in a direction substantially perpendicular to the side surface of the nonmagnetic structure. As a result, a side shield having a gradient in saturation magnetization in the yoke direction is formed. In embodiments in which the side gap 108 and main pole 110 are formed on the side shield layer(s), a portion of the side shield on which the main pole 110 resides may form the leading shield 106.

The region around the shield layer(s) is refilled with a nonmagnetic material, such as a nonmagnetic insulator, via step 216. Step 216 may include depositing aluminum oxide. The layers may then be planarized, via step 218. Fabrication of the writer may then be completed.

Using the method 210, a magnetic transducer having improved performance may be fabricated. Because of the gradient in the saturation magnetization of the side shields 130 the benefits thereof may be achieved.

Figure 5:
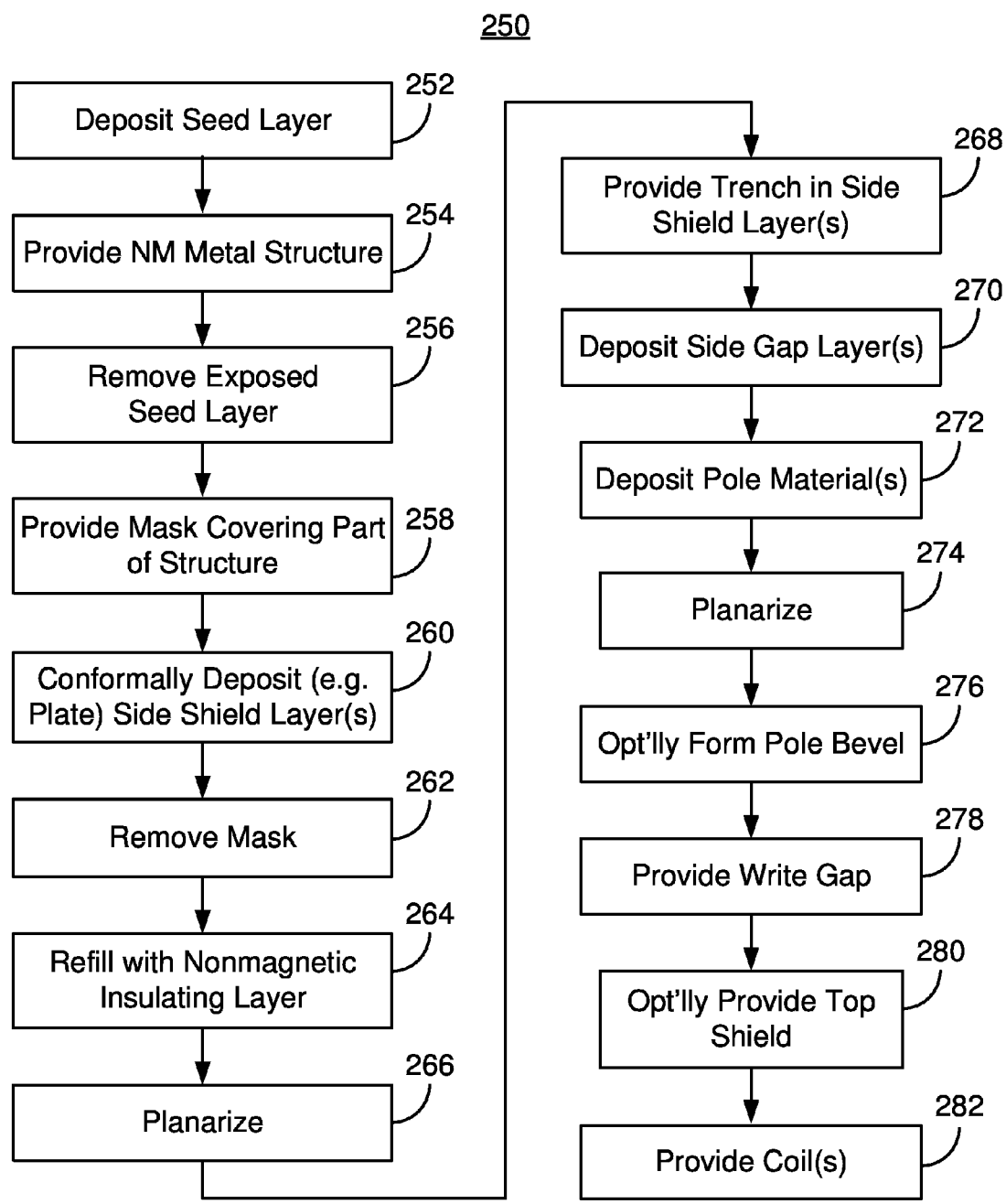
FIG. 5 is a flow chart depicting another exemplary embodiment of a method for providing a side shield having a gradient in side shield saturation magnetization.

FIG. 5 depicts an exemplary embodiment of a method 250 for providing a magnetic transducer having side shields that have a gradient in saturation magnetization such that the saturation magnetization increases in the yoke direction. For simplicity, some steps may be omitted, interleaved, performed in another order and/or combined. The method 250 is also described in the context of providing a magnetic recording transducer 150 depicted in FIGS. 6A-6B through FIGS. 19A-19D depict various views of an exemplary embodiment of a transducer 150 during fabrication using the method 250. The method 250 may be used to fabricate multiple magnetic recording transducers at substantially the same time. The method 250 may also be used to fabricate other data storage devices. The method 250 is also described in the context of particular layers. A particular layer may include multiple materials and/or multiple sub-layers. The method 250 also may start after formation of other portions of the magnetic recording transducer or disk drive of which the magnetic recording transducer is a part. For example, the method 250 may start after a read transducer, return pole/ shield and/or other structure(s) have been fabricated.

A seed layer is provided, via step 252. The seed layer is generally desired to be conductive to allow plating of side shield layer(s). The seed layer may be blanket deposited in an area including but not limited to the region in which the side shields. Alternatively, portions of the magnetic transducer that have already been fabricated may be covered by a mask, the seed layer deposited, and the mask removed. The seed layer might be nonmagnetic. Such a seed layer might include Ru, NiCr and/or NiCu. Alternatively, the seed layer might be magnetic.

Figure 6A:
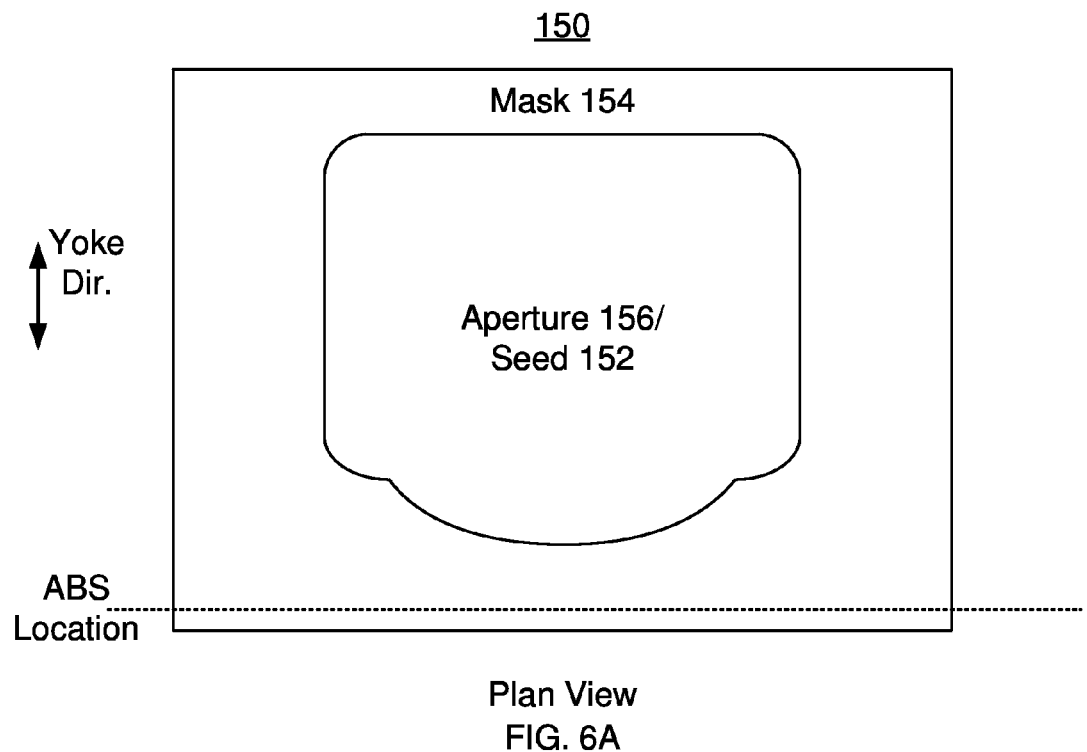
FIGS. 6A-6B through 19A-19D depict another exemplary embodiment of a portion of a magnetic recording transducer with side shields having a gradient in saturation magnetization during fabrication.
Figure 6B:
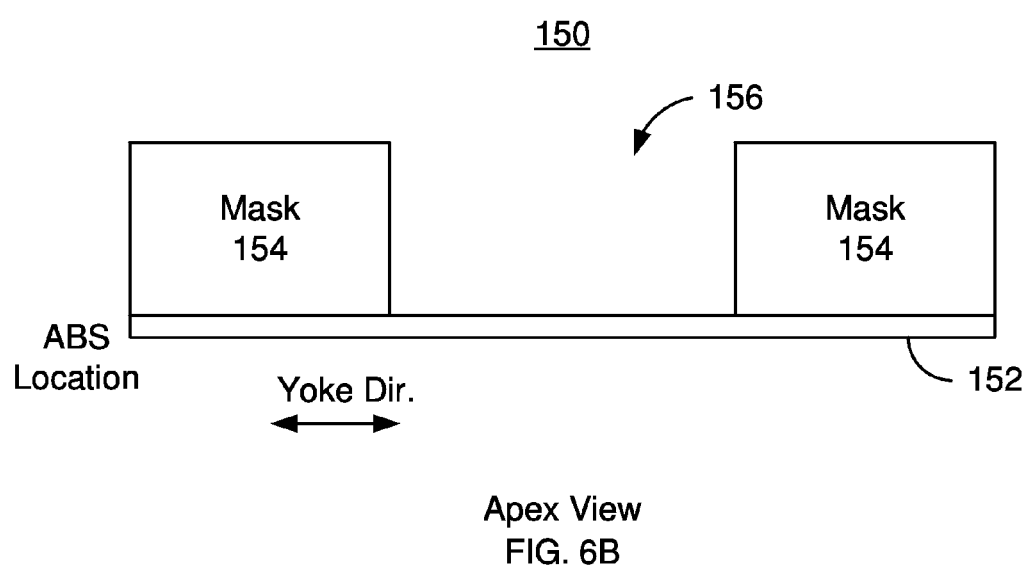
Figure 7A:
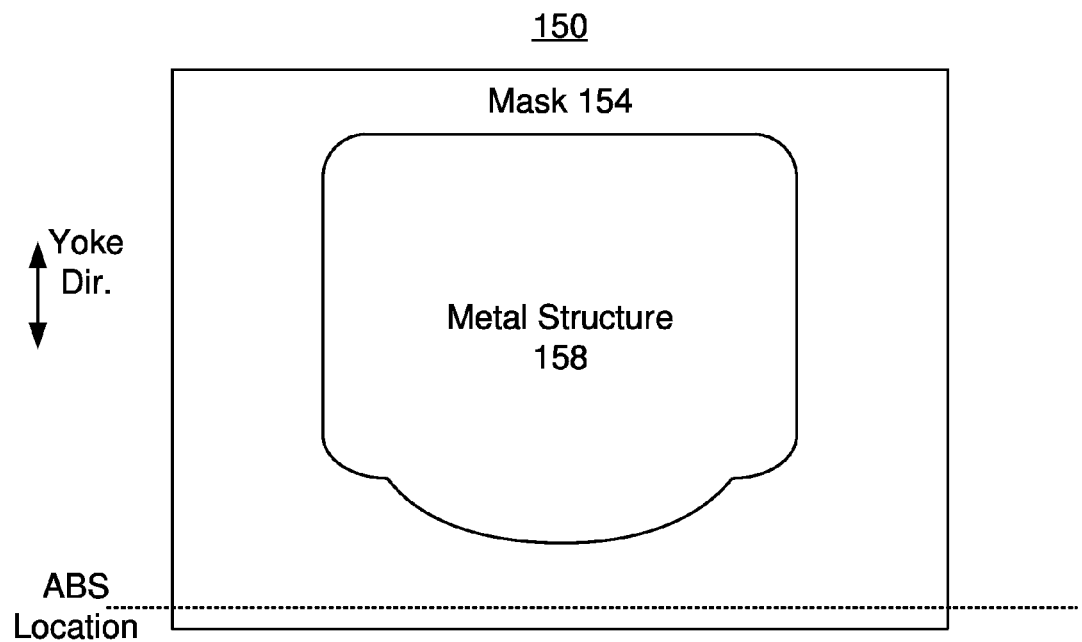
Figure 7B:
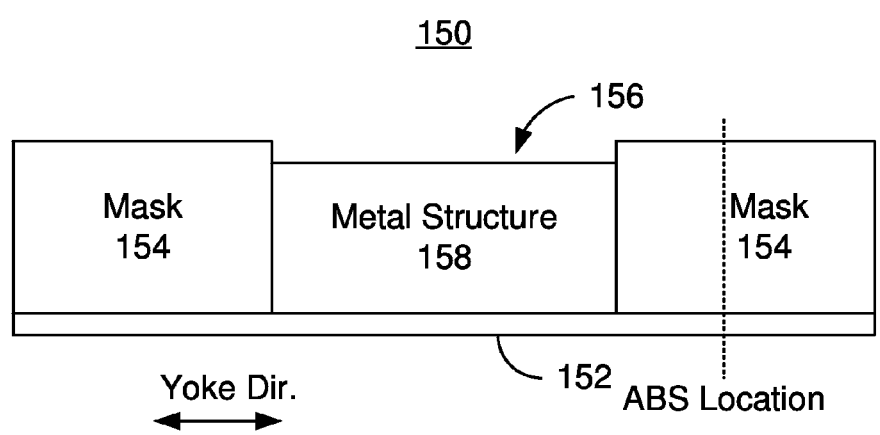
Figure 8A:
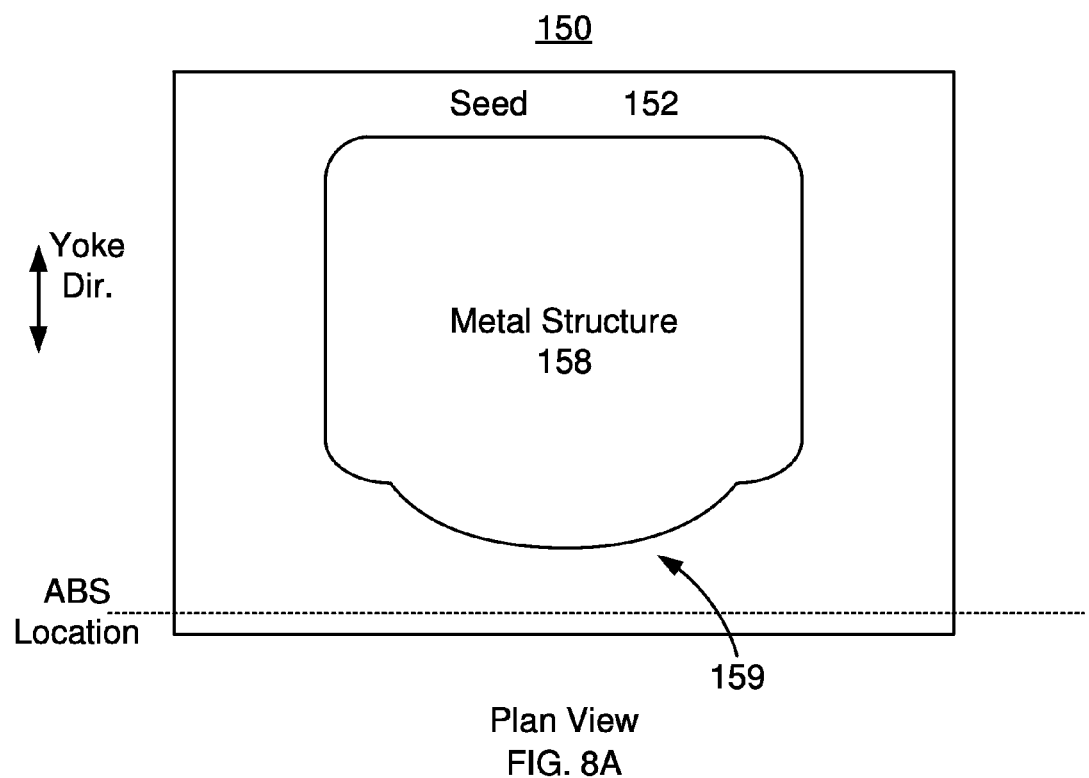
Figure 8B:
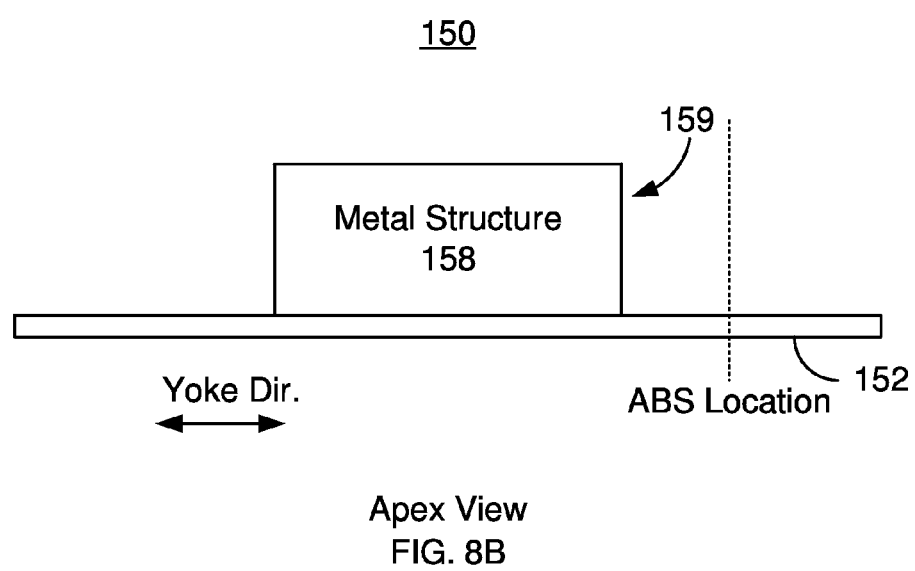

A nonmagnetic metal structure is provided on the on the seed layer, via step 254. The nonmagnetic metal structure has a side surface parallel to the ABS and a top surface. As discussed above, the side surface being parallel to the ABS includes only a portion of the side surface being parallel to the ABS. However, the side surface is generally desired to be oriented along the ABS. FIGS. 6A and 6B, 7A and 7B and 8A and 8B depict the magnetic transducer 150 during step 254. FIGS. 6A-6B depict plans and apex views, respectively, after deposition of the seed layer 152 and formation of a mask 154 having aperture 156 therein. The mask 154 may be a photoresist mask. The aperture 156 has the shape and location of the nonmagnetic structure being formed. The surface at which the ABS will be after lapping is shown as the ABS location. FIGS. 7A and 7B depict plan and apex views, respectively, of the transducer 150 after the metal for the nonmagnetic metal structure 158 has been provided in the aperture 156. The nonmagnetic metal structure 158 may include one or more of NiP, Ru, NiCr and Cu. In some embodiments, NiP may be desired to be used. FIGS. 8A-8B depict plan and ABS views, respectively, of the transducer 150 after the mask 154 has been removed. In some embodiments, the photoresist mask 154 is stripped. Thus, the nonmagnetic metal structure 158 remains. The nonmagnetic metal structure 158 includes side surface 159. As can be seen in FIG. 8A, the side surface 159 is not perfectly parallel to the ABS location, but is generally oriented along the ABS location. A portion of the side surface 159 near the center of the drawings is parallel to the ABS location. In the embodiment shown, the side surface 159 is curved in the yoke direction. In other embodiments the side surface 159 may be flat.

Figure 9A:
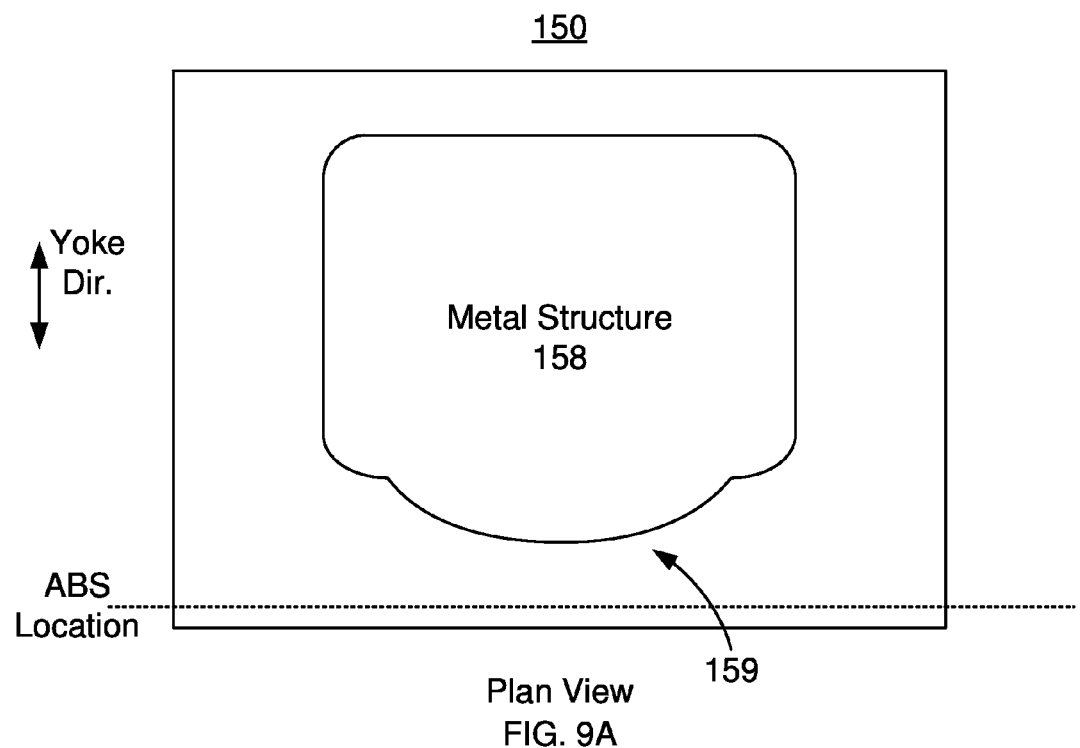
Figure 9B:
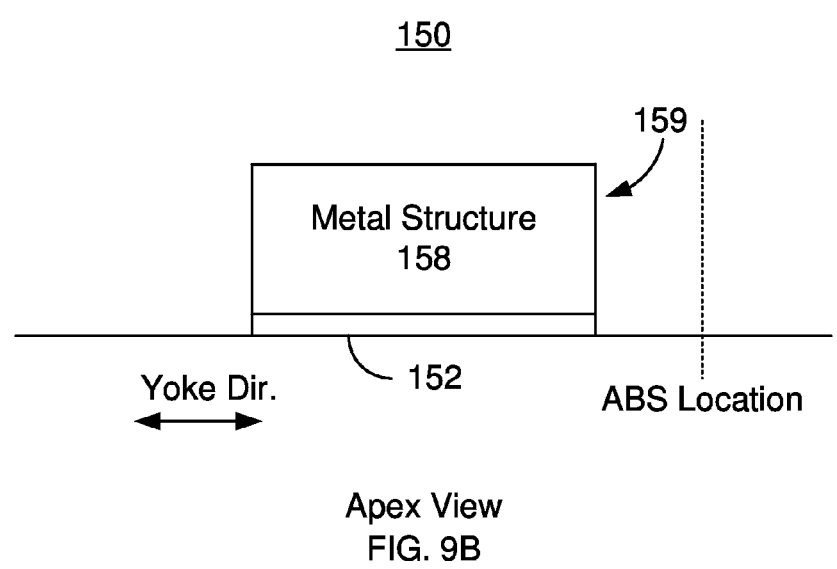

A portion of the seed layer 152 that is uncovered by the nonmagnetic metal structure 158 is removed, via step 256. The exposed portion of the seed 152 may be removed via ion milling. FIGS. 9A-9B depict plan and apex views, respectively, of the magnetic transducer 150 after step 256 is completed. Thus, the seed layer 152 remains only under the magnetic structure 158.

Figure 10A:
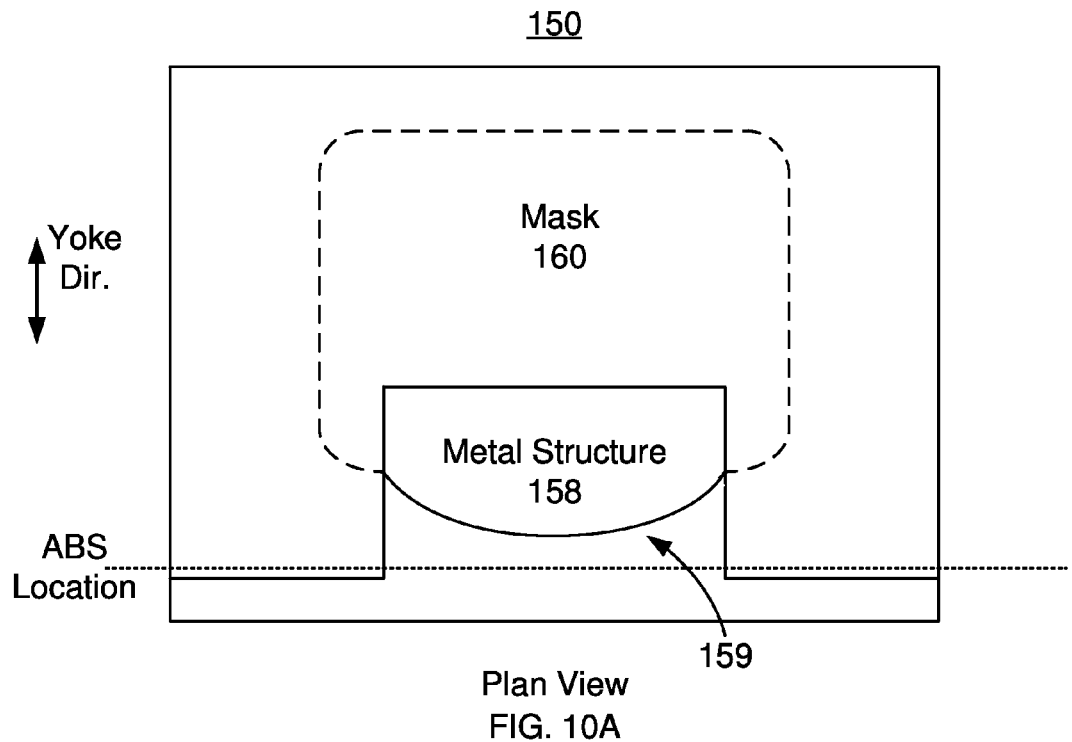
Figure 10B:
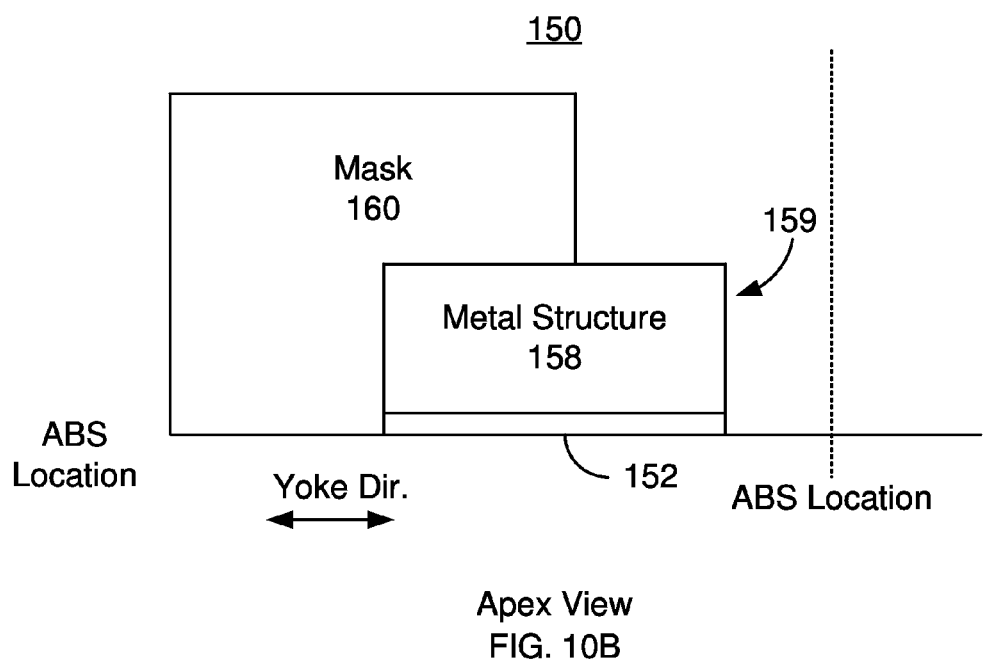

A mask that covers a portion of the top surface of the nonmagnetic metal structure 158 is provided, via step 258. Step 258 may include providing a photoresist mask. FIGS. 10A-10B depict plan and apex views of the transducer 150 after step 258 is performed. Thus, a mask 160 that covers part of the top surface of the metal structure 158 has been formed. The desired side surface 159 of the metal structure 158 is still exposed.

Figure 11A:
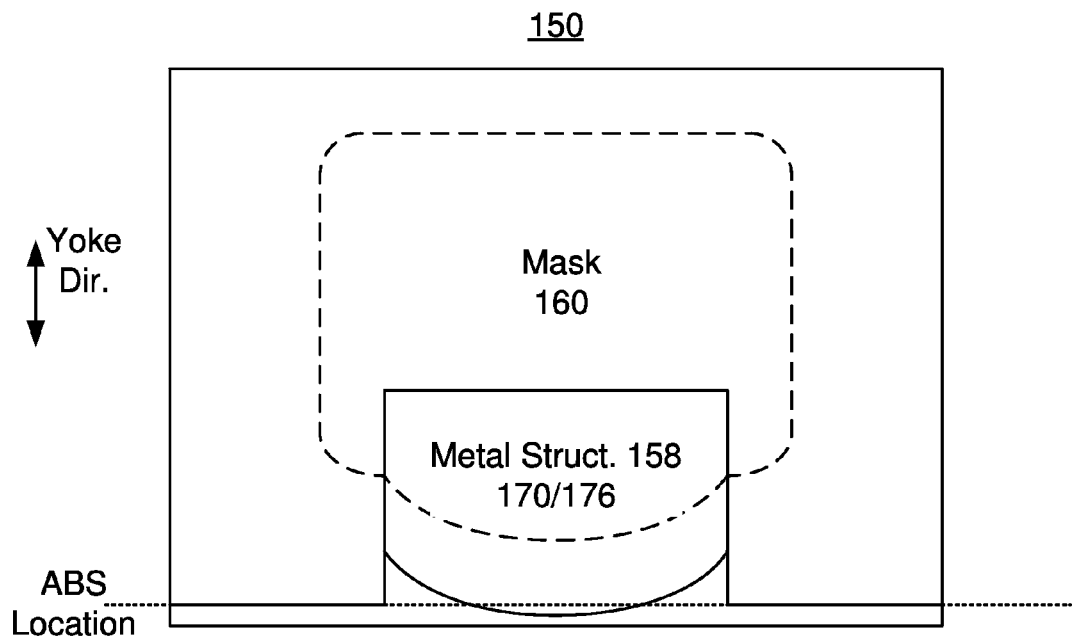
Figure 11B:
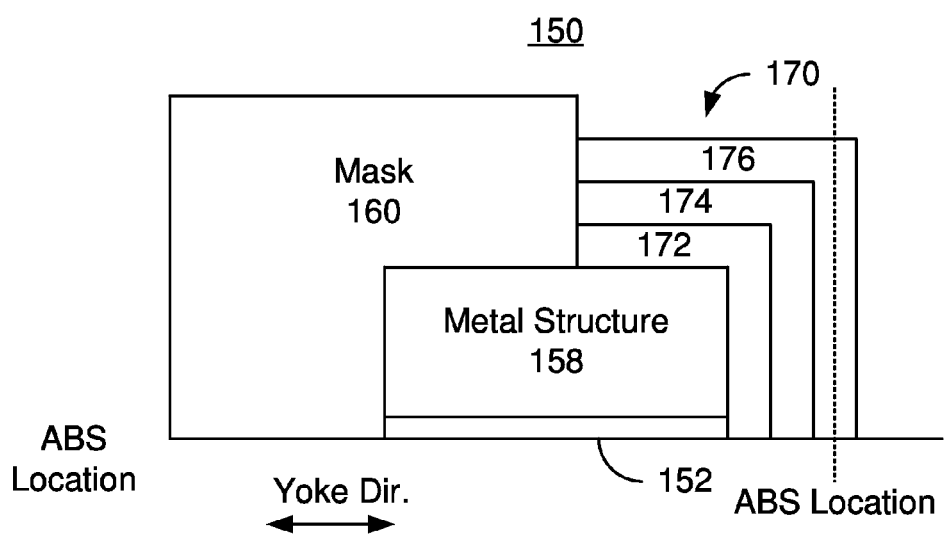

At least one side shield layer is conformally deposited, via step 260. The side shield layer(s) may be plated. In alternate embodiments, the side shield layer(s) may be sputtered or deposited in another manner. FIGS. 11A and 11B depict plan and apex views of the transducer 150 after step 260 is performed. Thus, side shield layers 170 are shown. In the embodiment shown, three layers 172, 174 and 176 (collectively 170) have been plated. Thus, the side shield layers 170 have grown out from the metal structure 158, rather than up from the insulating layer below the metal structure. Stated differently, the growth direction for the side shield layers 170 is generally along the yoke direction. Thus, each side shield layer 172, 174 and 176 has a different saturation magnetization. For example, the side shield layer 172, 174 and 176 may be formed of NiFe, CoNiFe and CoFe, respectively. In each side shield layer 172, 174 and 176, the concentration of the constituents may be varied. Thus, each of the side shield layers 172, 174 and 176 may also have a gradient in the saturation magnetization. Note that in an alternate embodiment, each side shield layer 172, 174 and 176 may represent a different range of saturation magnetization of a single layer that has varying concentration(s) of magnetic constituent(s). Thus, the side shield layers 170 have a saturation magnetization that varies in the yoke direction. In the embodiment shown, the saturation magnetization of the side shield layers 170 may decrease closer to the ABS location. In addition, in some embodiments, the saturation magnetization of the side shield layers 170 may have a gradient in the cross-track and/or down track directions.

Figure 12A:
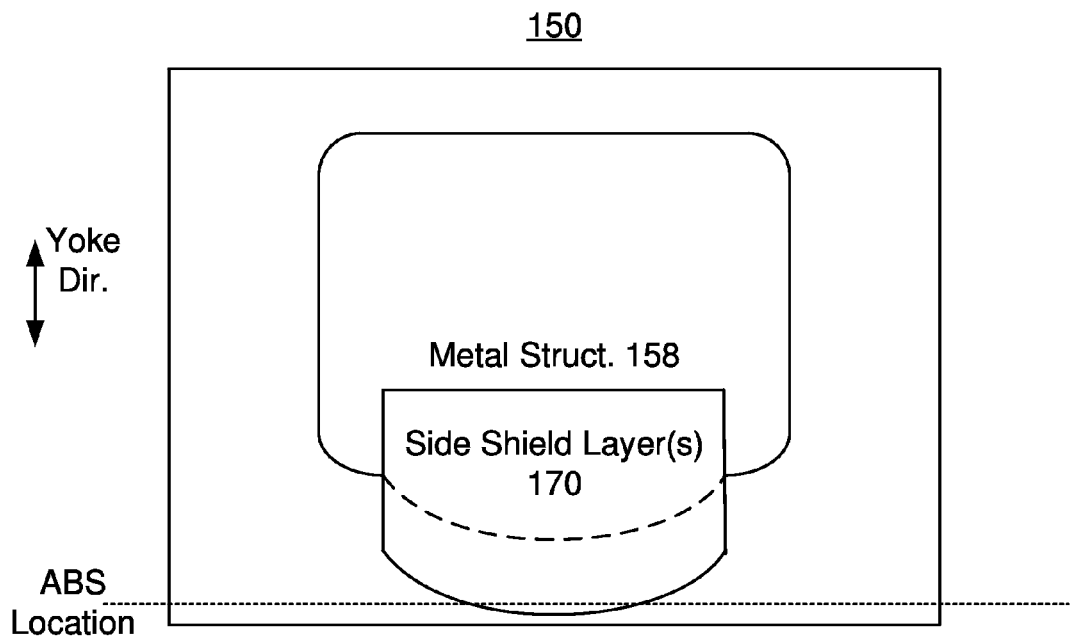
Figure 12B:
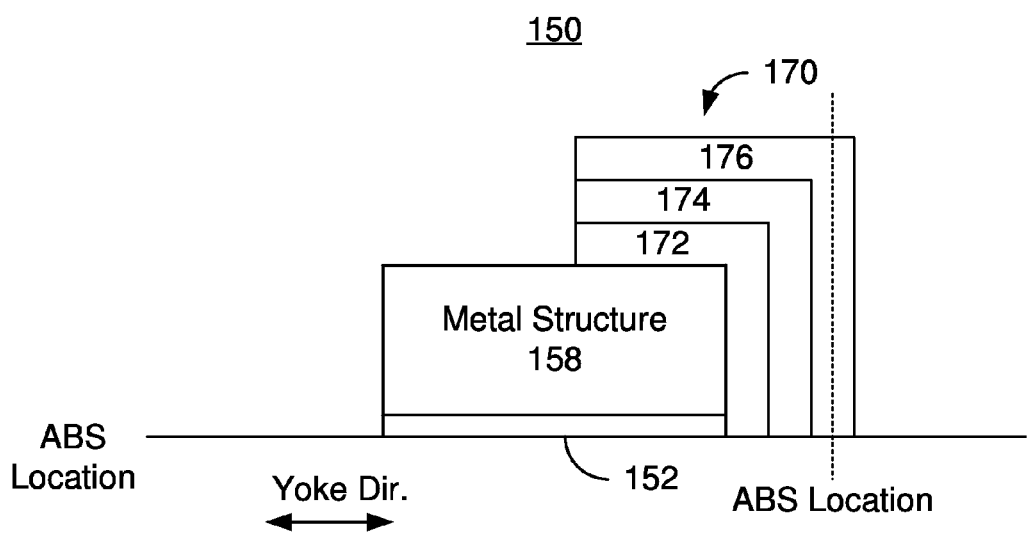

The mask 160 is removed, via step 262. A photoresist strip may be carried out in step 262. FIGS. 12A and 12B depict plan and apex views of the transducer 150 after step 262 is performed. Thus, the mask 160 has been removed.

Figure 13A:
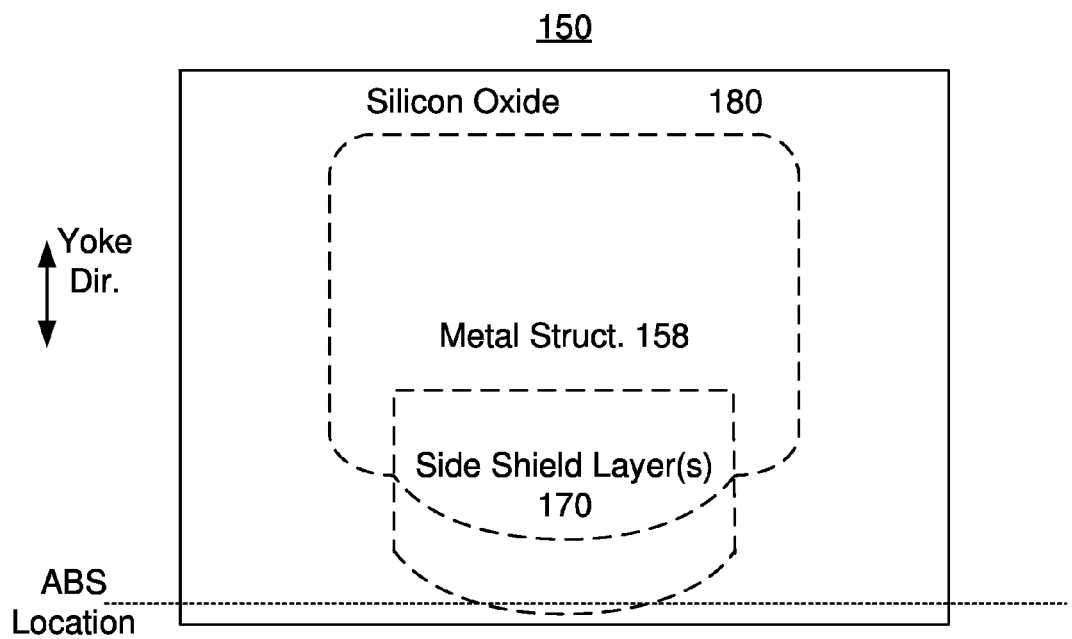
Figure 13B:
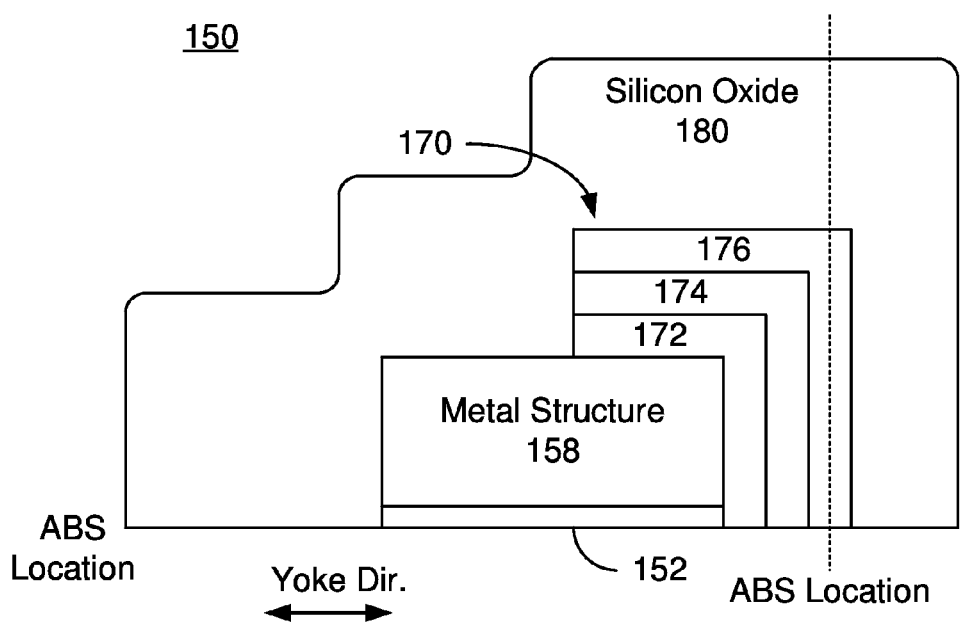

One or more nonmagnetic insulating layers are deposited after the mask 160 is removed, via step 264. Thus, a silicon oxide layer or other nonmagnetic layer maybe deposited. The nonmagnetic insulating layer(s) covering the side shield layers 170 and the exposed portion of the nonmagnetic metal structure 158. FIGS. 13A and 13B depict the transducer 150 after step 264 is performed. Thus, a silicon oxide layer 180 is shown. The silicon oxide layer 180 is sufficiently thick to refill the region around the metal structure 158.

Figure 14A:
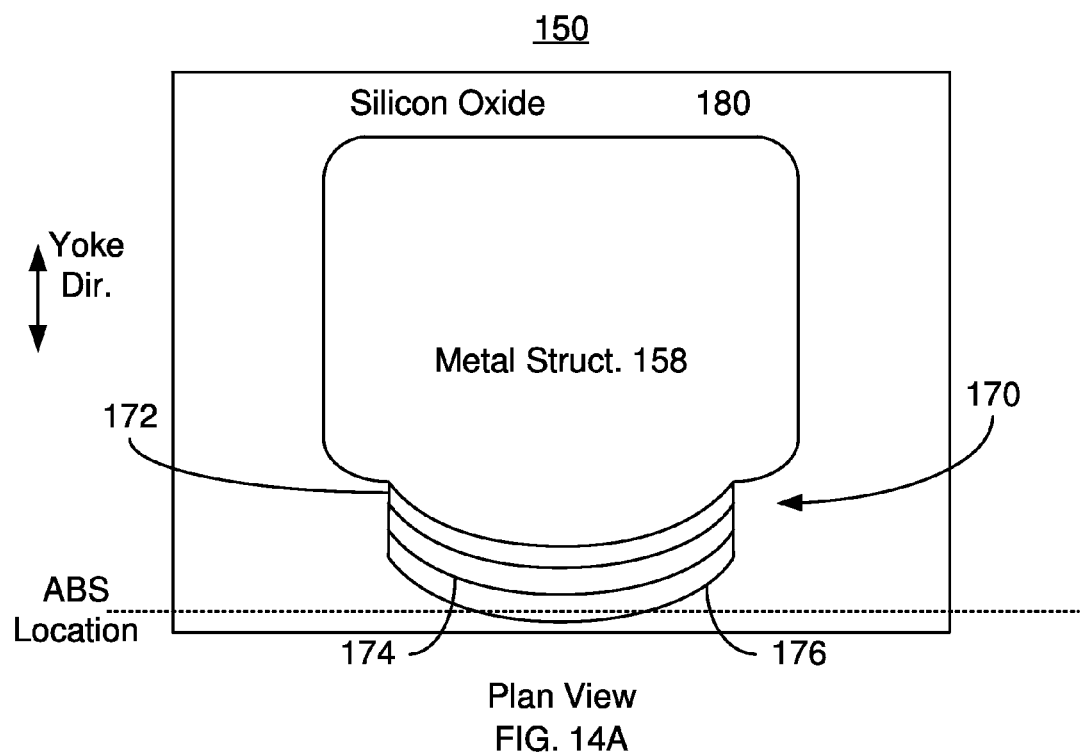
Figure 14B:
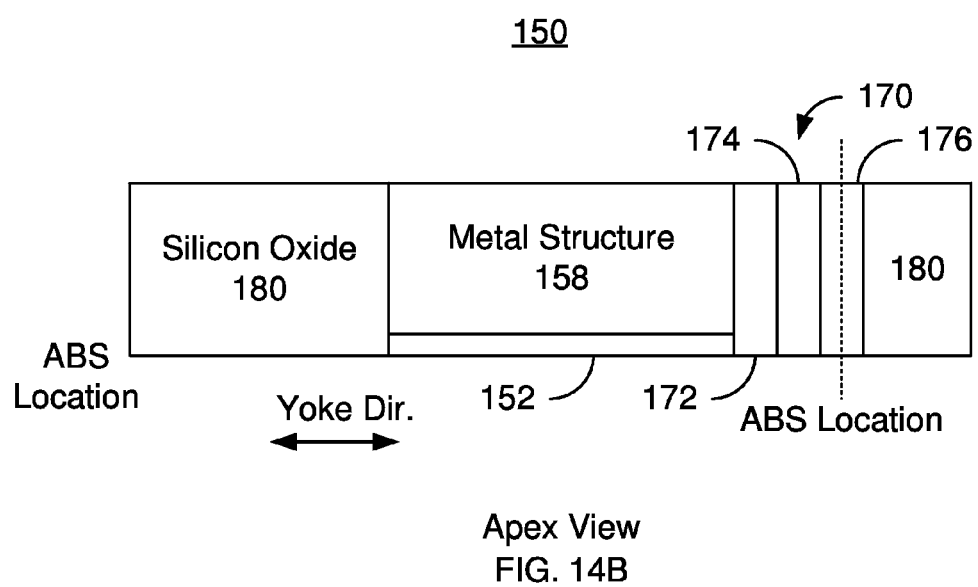
Figure 17A:
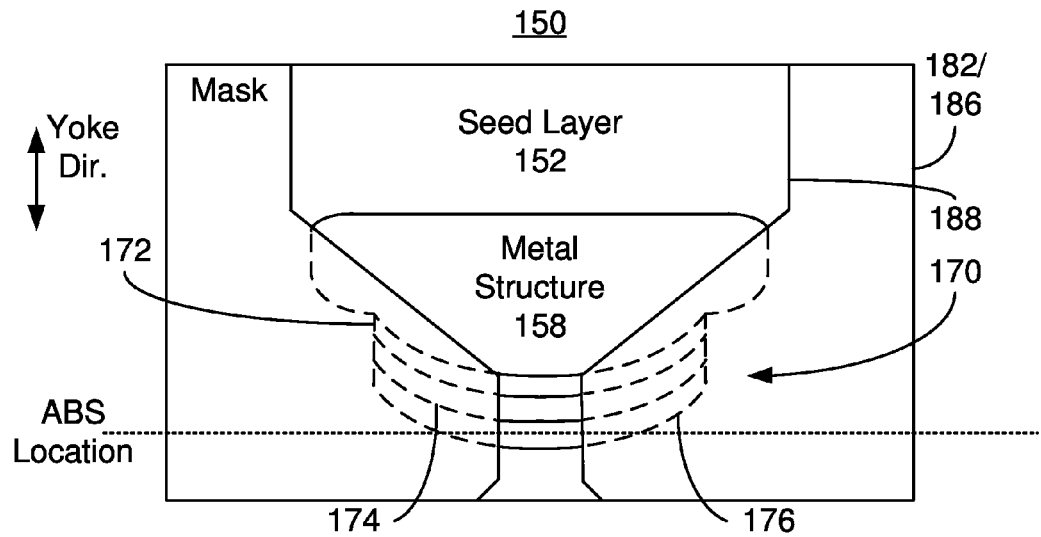
Figure 17B:
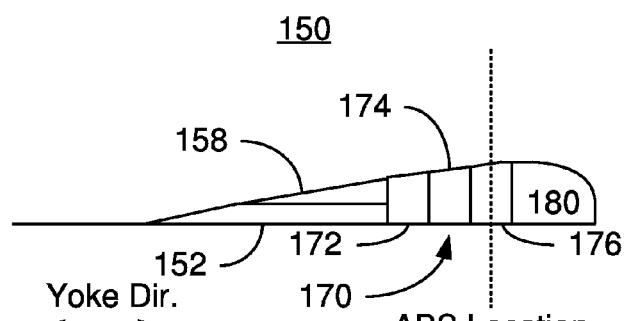
Figure 17C:
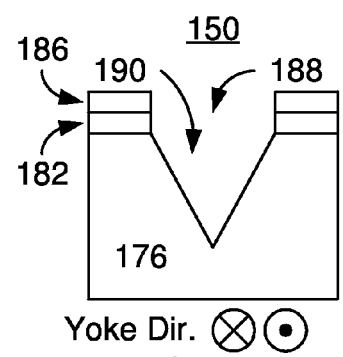
Figure 17D:
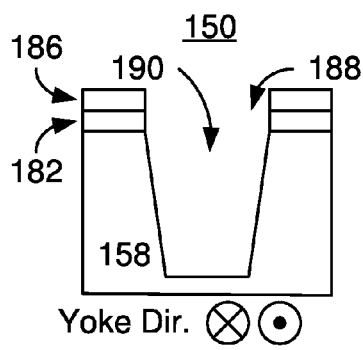
Figure 19A:
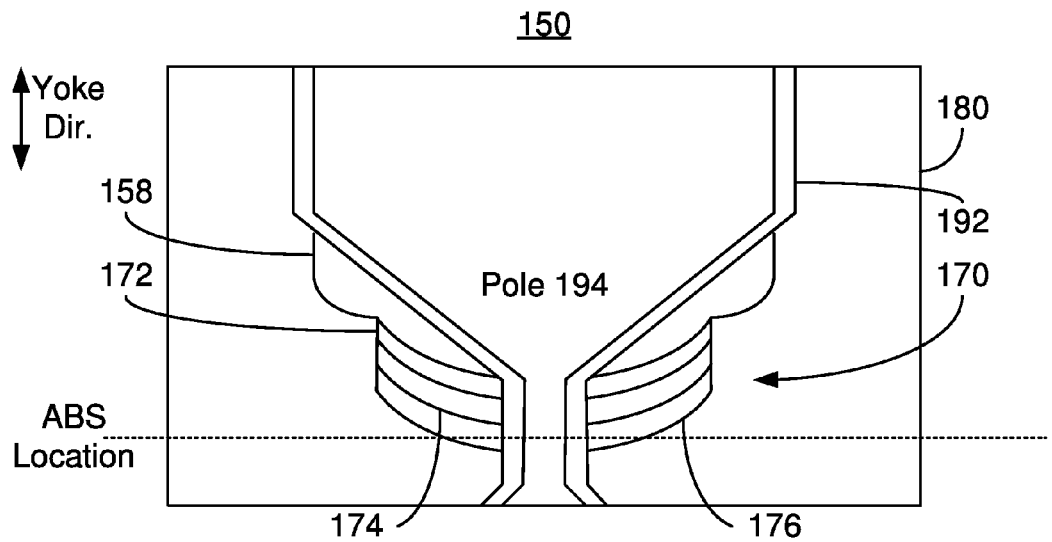
Figure 19B:
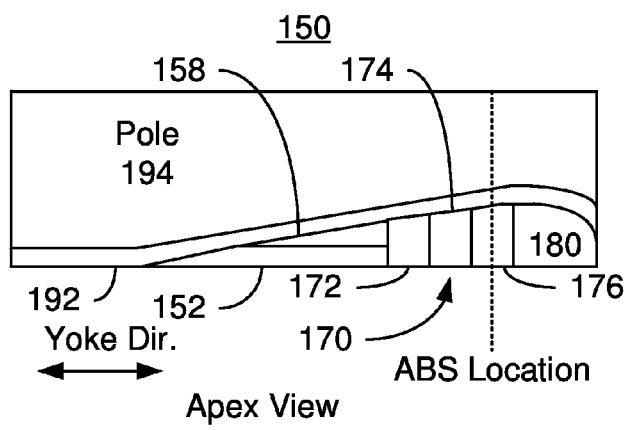
Figure 19C:
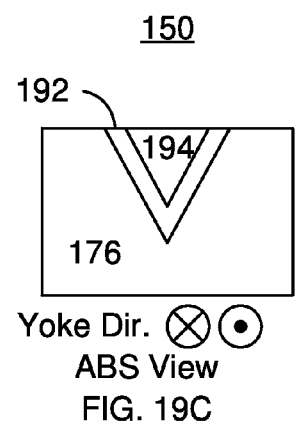
Figure 19D:
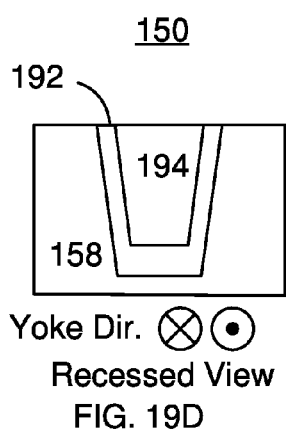

The portion of the magnetic transducer 150 that has been fabricated is planarized, via step 266. A chemical mechanical planarization (CMP) may be performed in step 266. Thus, the side shield layer(s) 170 and the nonmagnetic insulating layer such 180 are planarized. FIGS. 14A and 14B depict plan and apex views of the transducer 150 after step 266 is completed. Thus, the silicon oxide layer 180 remains in the regions around the side shield layers 170 and the nonmagnetic metal structure 158. The top of the nonmagnetic metal structure 158 is exposed. Thus, portions of the side shield layers 170 on the nonmagnetic metal structure 158 have been removed.

A trench is formed in the side shield layers 170 and nonmagnetic metal structure 158, via step 268. Thus, part of the side shield layer(s) 170 and nonmagnetic metal structure 158 are removed. A portion of the nonmagnetic insulating layer 180 may also be removed. The trench has a shape and location corresponding to the pole being formed. FIGS. 15A-15C through 17A-17D depict various views of the transducer 150 during step 268. FIGS. 15A, 15B and 15C depict plan, apex and ABS location views, respectively, of the transducer 150 during formation of the mask used in providing the trench. Thus, a hard mask layer 182 has been deposited. The hard mask layer 182 may include Ta. A photoresist mask 184 corresponding to the pole has also been provided using photolithography. An additional hard mask layer 186 has also been deposited. The additional hard mask layer 186 may be Cr. FIGS. 16A, 16B and 16C depict plan, apex and ABS location views, respectively, of the transducer after removal of the photoresist mask. Thus, the hard mask layers 182 and 186 having aperture 188 remain. The hard mask layers 182 and 186 form the hard mask for the trench. FIGS. 17A, 17B, 17C and 17D depict plan, apex, ABS location and recessed views, respectively, of the transducer after step 268 is completed. The recessed view is taken along a plane parallel to the ABS, but further into the transducer 150 in the yoke direction. Thus, trench 190 has been formed. The trench 190 is formed in the side shield layers 170, the nonmagnetic structure 158, seed layer 152 and nonmagnetic insulating layer 180. In the embodiment shown, the depth, width and profile of the trench change with distance from the ABS location.

One or more side gap layers are deposited, via step 270. The side gap layer(s) may be blanket deposited. Thus, part of the side gap layer(s) may be in the trench 190, while another portion of the side gap layer(s) are outside of the trench 190. FIGS. 18A, 18B, 18C, and 18D depict plan, apex, ABS and recessed views, respectively, of the transducer 150. Thus, the side gap layer(s) 190 have been deposited. In some embodiments, the side gap layer(s) are conformal. Thus, the pole formed is conformal to the side shields formed by the remaining part of side shield layers 170. In other embodiments, the side gap layer(s) may not form a conformal side gap. For example, the side gap layer(s) may have different thicknesses in different regions and/or may be able to occupy only a portion of the trench 190. Thus, the side gap formed may be conformal or nonconformal. In the embodiment depicted in FIGS. 18A-18D the side gaps are conformal.

The material(s) for the pole are deposited, via step 272. In some embodiments, high saturation magnetization material(s) are provided in step 272. In other embodiments, nonmagnetic layers/structures and/or lower saturation magnetization materials may also be used in the pole. Such materials are provided as part of step 272.

A portion of the pole material(s) external to the trench 190 may be removed, via step 274. Step 274 may include performing another planarization, such as a CMP. FIGS. 19A, 19B, 19C and 19D depict plan, apex, ABS and recessed views, respectively, of the transducer 150 after step 274 is performed. Thus, the pole 194 is shown. In addition, the pole 194 is on the side shield layers 170 at and near the ABS. Thus, the side shield layers 170 form the side shield and a leading shield. In some embodiments, other structures such as a trailing bevel may be formed in the pole 194, via step 276. The write gap may be provided on the pole 194, via step 278. The top shield and coil(s) for energizing the pole 194 are provided, via step 280 and 282, respectively. Fabrication of the transducer 150 may then be completed. For example other structures may be formed and the transducer may be lapped to the ABS.

Using the method 250, the transducer 150 including side shields 170, which also form a leading shield below the pole 194, may be provided. Because the saturation magnetization increases further from the ABS, flux shunting, field gradient, and WATER may be improved. Thus, performance of the transducer 150 may be improved.

What is claimed is:

1. A method for providing a magnetic transducer having media-facing surface (MFS) comprising:
   providing a pole, wherein a portion of the pole resides at the WS;
   providing a side gap;

providing at least one coil for energizing the main pole; and providing a side shield, wherein the side gap is between the pole and the side shield, wherein the side shield has a gradient in a saturation magnetization such that the saturation magnetization changes in a yoke direction perpendicular to the WS, wherein the providing the side shield further includes:

providing a nonmagnetic structure having a side surface parallel to the WS;

providing at least one side shield layer, wherein a portion of the at least one side shield layer resides on the side surface, wherein the portion of the at least one side shield layer has the gradient in the saturation magnetization, and wherein at least part of the side shield is formed by the portion of the at least one side shield layer.

2. The method of claim 1 wherein the providing the at least one side shield layer includes conformally depositing the at least one side shield layer.

3. The method of claim 1 wherein the providing the side shield further includes:

depositing a seed layer before the providing the nonmagnetic structure.

4. The method of claim 3 wherein the depositing the at least one side shield layer further includes:

plating the at least side shield layer on the seed layer and the nonmagnetic structure.

5. The method of claim 4 wherein the plating the at least one side shield layer further includes:

plating a layer having a varying concentration of at least one magnetic material to provide the gradient in the saturation magnetization.

6. The method of claim 5 wherein the plating the layer occurs in a single plating cell.

7. The method of claim 1 wherein the at least one side shield layer includes a plurality of side shield layers, each of the plurality of side shield layers having a different saturation magnetization than another layer of the plurality of side shield layers.

8. The method of claim 1 wherein the gradient in the saturation magnetization is configured such that the saturation magnetization increases monotonically in the yoke direction.

9. The method of claim 1 wherein the nonmagnetic structure includes a top surface, an additional portion of the at least one side shield layer residing on the top surface, the providing the side shield further including:

depositing at least one nonmagnetic insulating layer; and planarizing the at least one side shield layer and the at least one nonmagnetic insulating layer.

10. The method of claim 1 wherein the nonmagnetic structure is formed of a nonmagnetic metal.

11. The method of claim 10 wherein the nonmagnetic metal includes at least one of NiP, Cu, Ru, and NiCr.

12. The method of claim 1 wherein the providing the side gap includes:

removing a first portion of the at least one side shield layer to form a trench therein, a second portion of the at least one side shield layer forming the side shield; and depositing at least one side gap layer, a portion of the at least one side gap layer residing in the trench.

13. The method of claim 12 wherein the providing the pole further includes:

depositing at least one pole material, a first portion of the at least one pole;

material residing in the trench and forming the pole; and removing a second portion of the at least one pole material external to the trench.

14. The method of claim 13 wherein a third portion of the at least one side shield material in the trench below the pole forms a leading shield.

15. The method of claim 1 further comprising:

providing a leading shield; and providing a trailing shield such that the leading shield, the trailing shield and the side shield form a wraparound shield.

16. The method of claim 1 wherein the saturation magnetization increases with increasing distance from the ABS.

17. The method of claim 1 wherein the saturation magnetization decreases with increasing distance from the pole in a cross-track direction.

18. A method for providing a data storage device having an air-bearing surface (ABS) comprising:

depositing a seed layer;

providing a nonmagnetic metal structure on the seed layer, wherein the nonmagnetic metal structure has a side surface parallel to the ABS and a top surface;

removing an uncovered portion of the seed layer exposed by the nonmagnetic metal structure;

providing a mask covering a portion of the top surface of the nonmagnetic metal structure;

conformally depositing at least one side shield layer, wherein a first portion of the at least one side shield layer resides on the side surface, wherein the first portion of the at least one side shield layer has a gradient in the saturation magnetization such that the saturation magnetization changes in a yoke direction perpendicular to the ABS, wherein a second portion of the at least one side shield layer resides on a remaining portion of the top surface not covered by the mask;

removing the mask;

depositing at least one nonmagnetic insulating layer after the mask is removed, wherein the at least one nonmagnetic insulating layer covers at least the at least one side shield layer and the portion of the nonmagnetic metal structure;

planarizing the at least one side shield layer and the at least one nonmagnetic insulating layer such that the nonmagnetic metal structure is exposed;

removing a first portion of the at least one side shield layer and the nonmagnetic metal structure to form a trench therein, wherein a second portion of the at least one side shield layer forms a side shield;

depositing at least one side gap layer, wherein a first portion of the at least one side gap layer resides in the trench, and wherein a second portion of the at least one side gap layer resides external to the trench;

depositing at least one pole material, wherein a first portion of the at least one pole material resides in the trench and forming the pole;

removing a second portion of the at least one pole material external to the trench and a second portion of the at least one side gap material, wherein the first portion of the at least one pole material forms the pole, wherein the first portion of the at least one side gap layer forms the side gap, and wherein a third portion of the at least one side shield layer below the pole forms a leading shield;

providing a write gap on a top of at least part of the pole; and providing at least one coil for energizing the pole.

19. The method of claim 18 further comprising:
providing a trailing shield such that the leading shield, the trailing shield and the side shield form a wraparound shield.

* * * * *